United States Patent
Sato et al.

(10) Patent No.: US 7,072,083 B2
(45) Date of Patent: Jul. 4, 2006

(54) IMAGE READING APPARATUS, AND DIMMING CONTROL METHOD AND LINE SENSOR LAYOUT METHOD THEREFOR

(75) Inventors: Hiroshi Sato, Kawasaki (JP); Hiroyoshi Maruyama, Shizuoka-ken (JP); Ken Tanabe, Mishima (JP); Masashi Minami, Misato (JP); Shigeo Yamagata, Yokohama (JP); Mitsuru Kurita, Yokohama (JP); Koji Arai, Kawaguchi (JP); Tsutomu Utagawa, Yokohama (JP); Koichi Ishimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 409 days.

(21) Appl. No.: 10/663,481

(22) Filed: Sep. 15, 2003

(65) Prior Publication Data
US 2004/0051918 A1    Mar. 18, 2004

Related U.S. Application Data

(62) Division of application No. 09/318,994, filed on May 26, 1999, now Pat. No. 6,661,545.

(30) Foreign Application Priority Data

| Jun. 1, 1998 | (JP) | 10-151184 |
| Jul. 15, 1998 | (JP) | 10-200705 |
| Jul. 27, 1998 | (JP) | 10-211021 |
| Jul. 30, 1998 | (JP) | 10-215601 |

(51) Int. Cl.
    *H04N 1/46* (2006.01)
    *H04N 1/04* (2006.01)

(52) U.S. Cl. ............... 358/509; 358/475; 358/482; 358/483; 358/514

(58) Field of Classification Search ............ 358/475, 358/509, 482, 483, 512–514, 474, 487, 505, 358/506; 250/208.1, 234, 235, 216; 382/312, 382/318, 319; 355/67–69
See application file for complete search history.

(56) References Cited

U.S. PATENT DOCUMENTS 4,642,679 A    2/1987    Nagano ............... 358/509

(Continued)

FOREIGN PATENT DOCUMENTS

EP    0 158 962    10/1985

(Continued)

OTHER PUBLICATIONS

U.S. Appl. No. 09/377,562 (filed Aug. 19, 1999) entitled "Image Reading Apparatus and Control Method Thereof."

(Continued)

*Primary Examiner*—Cheukfan Lee
(74) *Attorney, Agent, or Firm*—Morgan & Finnegan, L.L.P.

(57) ABSTRACT

In an image reading apparatus for reading an original image using a light source containing a plurality of color components, a control pulse for dimming the light source is generated by pulse-width modulation symmetrically with respect to a reference timing (for example, the central position in one storage time or the storage start timing) in one predetermined storage time of a line sensor.

19 Claims, 27 Drawing Sheets

U.S. PATENT DOCUMENTS

| | | | | |
|---|---|---|---|---|
| 4,731,661 A | * | 3/1988 | Nagano | 358/509 |
| 5,278,674 A | | 1/1994 | Webb et al. | 358/475 |
| 5,450,215 A | | 9/1995 | Iwama | 358/509 |
| 5,625,470 A | * | 4/1997 | Ueta et al. | 358/505 |
| 5,920,408 A | | 7/1999 | Nagano | 358/509 |
| 6,084,692 A | * | 7/2000 | Ohtani et al. | 358/509 |
| 6,181,442 B1 | * | 1/2001 | Ogura et al. | 358/475 |
| 6,545,777 B1 | * | 4/2003 | Amimoto | 358/509 |
| 6,552,829 B1 | * | 4/2003 | Maciey et al. | 358/509 |

FOREIGN PATENT DOCUMENTS

| | | |
|---|---|---|
| EP | 000973327 A2 | 1/2002 |
| JP | 02000069232 A | 3/2000 |
| JP | 02000209399 A | 7/2000 |
| JP | 02000050017 A | 2/2002 |
| JP | 02000050018 A | 2/2002 |
| JP | 02000069225 A | 3/2002 |
| JP | 02000069227 A | 3/2002 |

OTHER PUBLICATIONS

Derwent Acct. No. 2000-263805, "Image reader has pulse width modulator to reduce central deviation of each color based on amount of light emitted from fluorescent lamp", Derwent-Week 200023 (Mar. 3, 2000).

Derwent Acct. No. 2001-251005, "Image reader has determination unit which updates control value used to center light emitted from fluorescent lamp around preset position." Derwent-Week 200126 (Feb. 16, 2001).

English Abstract of JP 02000209399.
English Abstract of JP02000069232A.
English Abstract of JP02000069227A.
English Abstract of JP02000069225A.
English Abstract of JP02000050018A.
English Abstract of JP02000050017A.

* cited by examiner

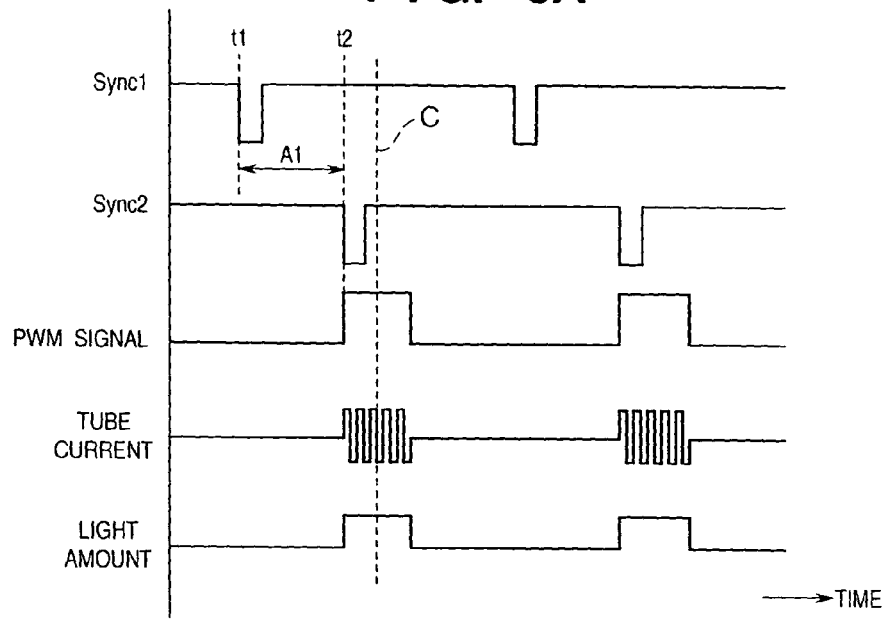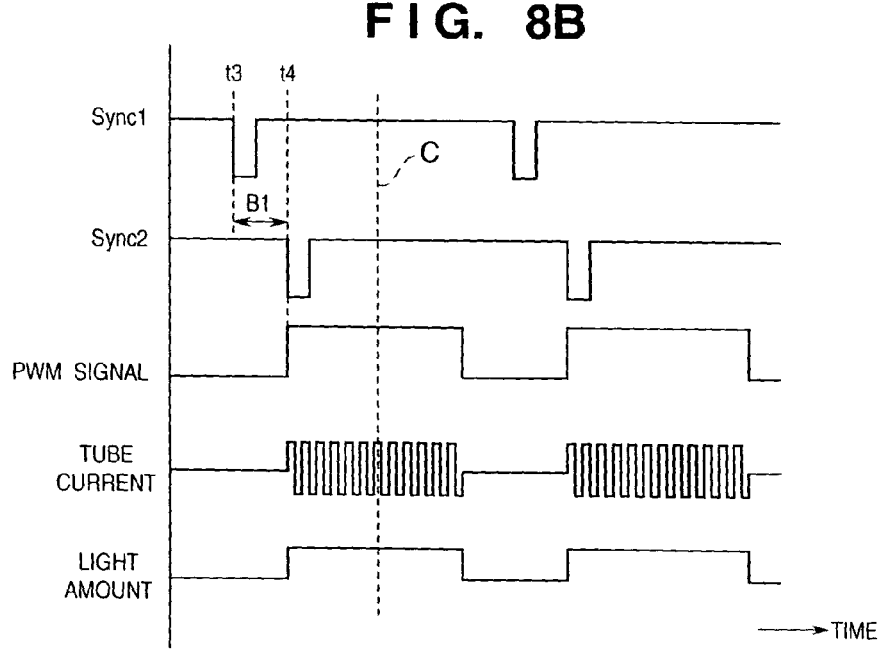

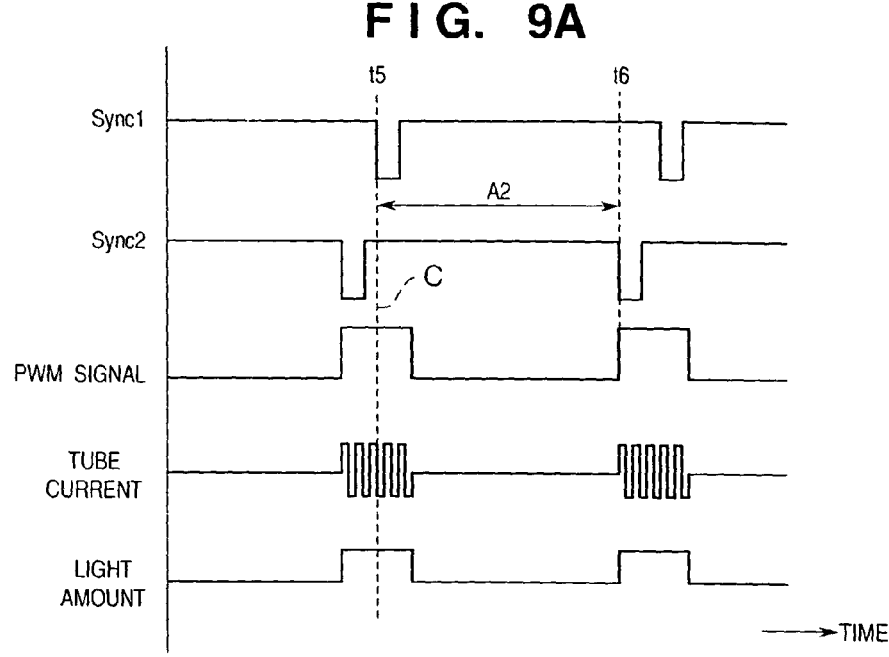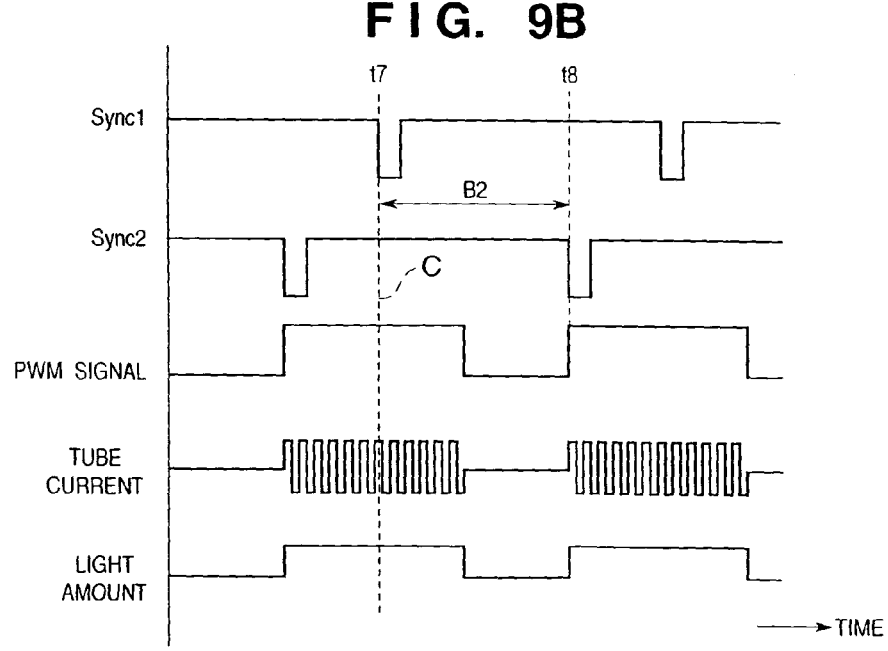

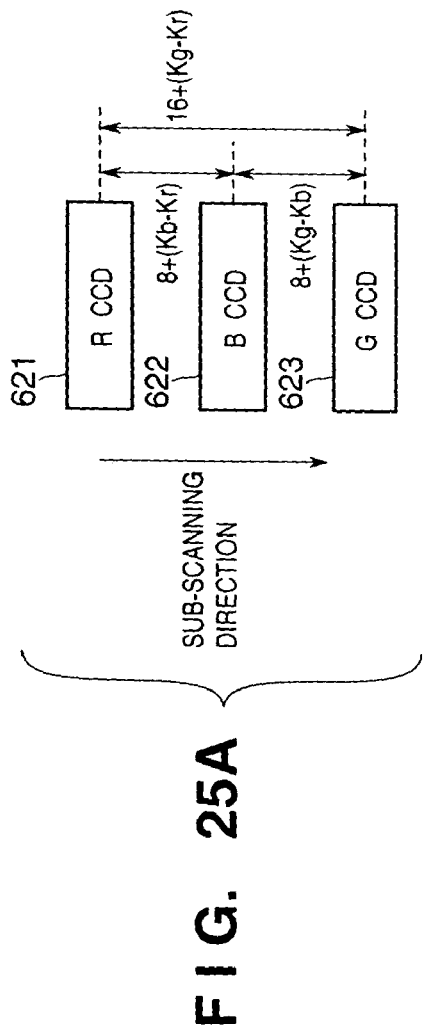
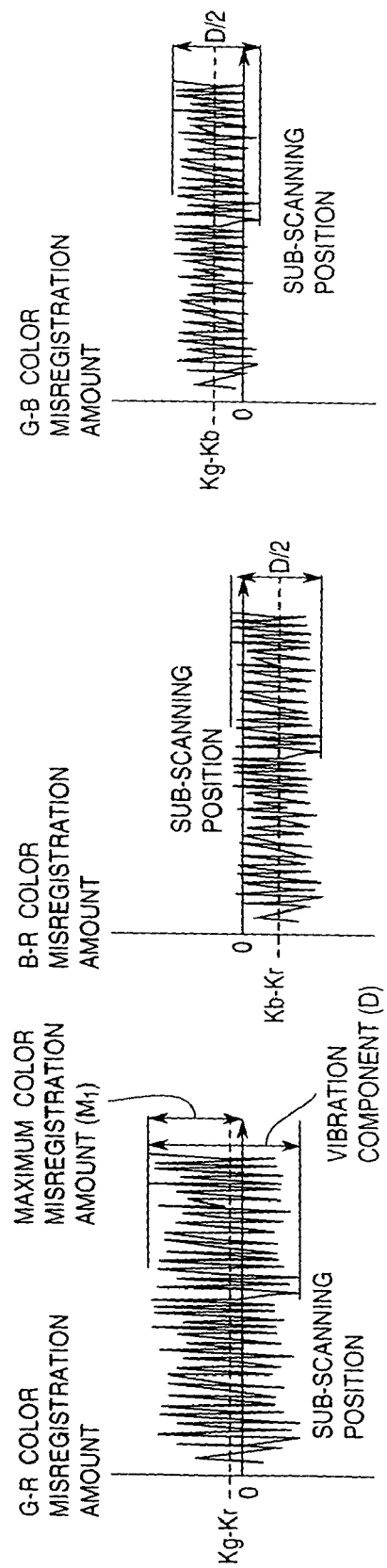

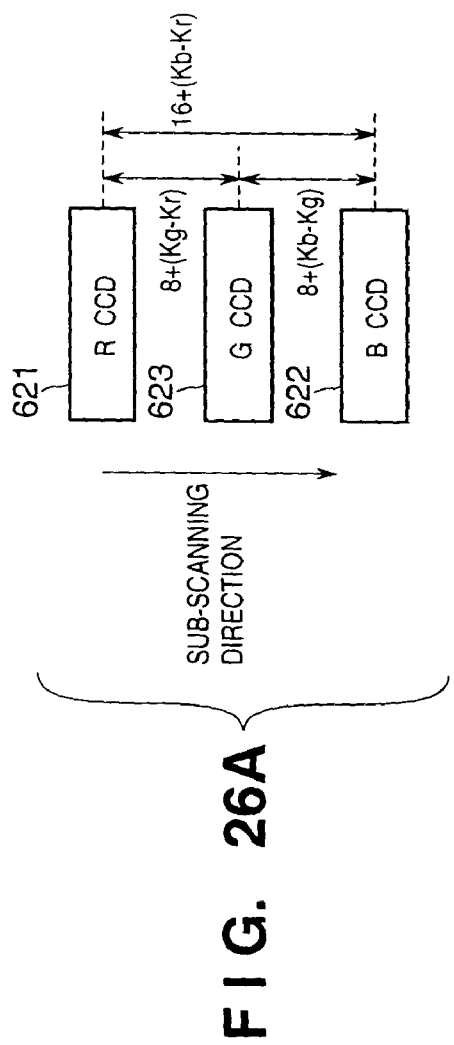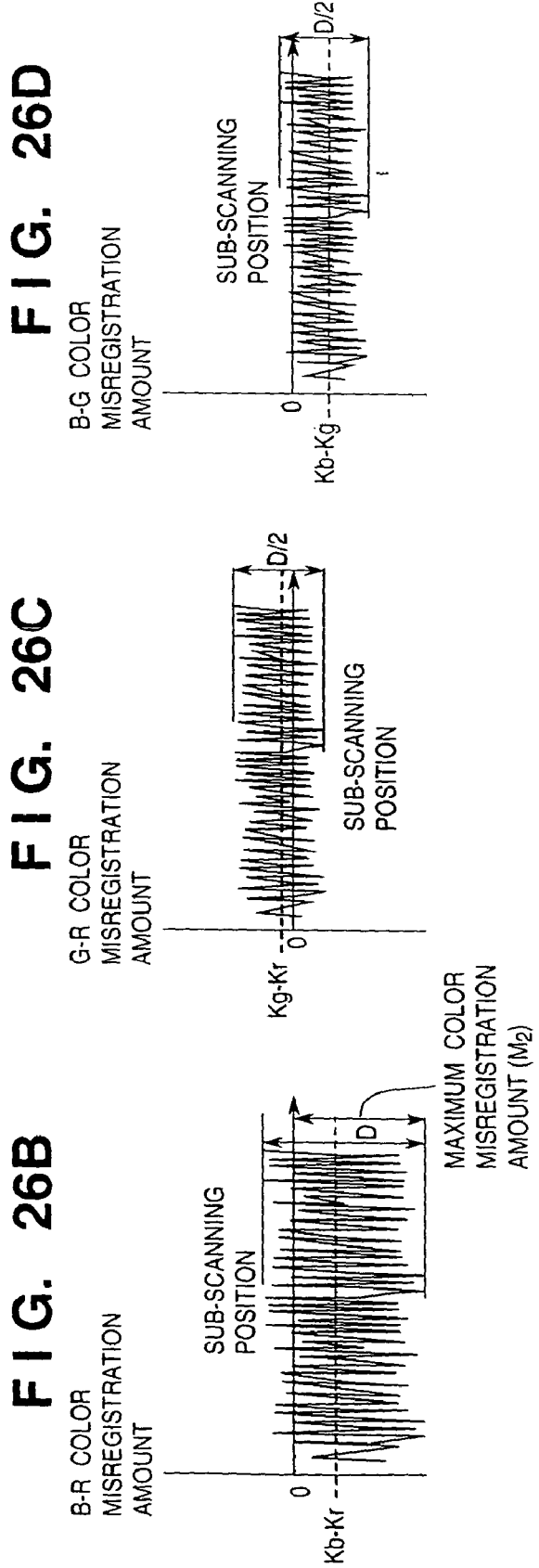

DIMMING CONTROL BY PWM

IMAGE READING APPARATUS, AND DIMMING CONTROL METHOD AND LINE SENSOR LAYOUT METHOD THEREFOR

This is divisional of application Ser. No. 09/318,994, filed May 26, 1999 now U.S. Pat No. 6,661,545.

BACKGROUND OF THE INVENTION

The present invention relates to an image reading apparatus for reading an image on an original, and dimming control method and line sensor layout method therefor.

Conventionally, various image reading apparatuses for forming the image of image information on an original on a plurality of line sensors (solid-state image sensing elements such as CCDs) through an imaging optical system and reading the image as monochromatic or color digital image information on the basis of output signals from the line sensors have been proposed.

FIG. 29 is a schematic view showing principal part of the optical system of a conventional color image reading apparatus.

Referring to FIG. 29, an original (not shown) placed on an original glass table 100 is illuminated with a rod-shaped light source 101. A reflecting shade 102 is used to improve the illumination efficiency. Light from the original illuminated with the rod-shaped light source 101 and reflecting shade 102 is guided to an imaging optical system 104 through mirrors 103-a, 103-b, and 103-c. The imaging optical system 104 forms the image of image information of the original on a solid-state image sensing element (line sensor) 105.

The line sensors 105 comprises three line sensors independently prepared for R, G, and B signals. A light amount sensor 106 detects the light amount of the rod-shaped light source 101. The rod-shaped light source is ON/OFF-controlled on the basis of the output from the light amount sensor 106 such that the rod-shaped light source 101 emits light in a predetermined amount.

As the mirror 103-a is moved by a mechanism (not shown) in a main-scanning direction B at a scanning speed v, and the mirrors 103-b and 103-c move in a sub-scanning direction A at a speed of v/2 in synchronism with movement of the mirror 103-a. Thereby, the image representing an original surface of the main-scanning direction is sequentially formed on the line sensor 101 as a solid-state image sensing element. The image formed on the solid-state image sensing element 105 is converted into an electrical signal, sent to an output device (not shown), and printed, or sent to a storage device to store the input image information.

As the light source of such an image reading apparatus, a halogen lamp is conventionally used. A halogen lamp has a high luminance. However, since this lamp exhibits a large increase in temperature and requires power consumption of 200 to 300 W. power consumption of the entire apparatus increases. In recent years, to avoid this problem, high-luminance fluorescent lamps or xenon lamps have been developed and used as light sources for image reading apparatuses.

Generally, a fluorescent lamp or xenon lamp seals a small content of mercury mass and Ar or Kr, or Xe at several Torr in a rod-shaped hollow tube. Various phosphors are applied to the inner wall of the hollow tube, and electrodes are formed at the two ends of the hollow tube. In a fluorescent lamp or xenon lamp with this structure, UV rays are emitted from mercury or various gases upon discharge from the electrodes, and accordingly, the phosphors applied to the inner wall of the tube are excited to emit visible light in accordance with the light-emitting characteristics of the phosphors. Phosphors to be employed are selected in accordance with spectral energy characteristics required for a light source. Especially, a color image reading apparatus requires a light source having a wide wavelength range corresponding to R, G, and B (red, green, and blue) components. When a light source with a particularly high luminance is necessary, phosphors of a plurality of colors are mixed and applied to the inner wall of a tube.

However, the above-described conventional image reading apparatus has the following disadvantages.

The light-emitting amount (light-emitting intensity) of a fluorescent lamp or xenon lamp is generally controlled by pulse-width modulation (PWM) for controlling the pulse width corresponding to the ON time while keeping the value of a current flowing to the lamp constant, unlike a halogen lamp which controls the lighting voltage. PWM is employed because a fluorescent lamp or xenon lamp starts light emission when the current value exceeds a predetermined value. If the light-emitting amount is controlled by controlling the value of the current to be supplied, the range of light-emitting amount control becomes narrow.

FIG. 30 shows a control waveform for controlling the light-emitting amount of a fluorescent lamp by pulse-width modulation. In FIG. 30, the abscissa represents time, and the ordinate represents a current value for controlling the light-emitting amount of the light source. A period Hsync on the abscissa represents a time corresponding to a predetermined storage time of a solid-state image sensing element. This time corresponds to a time when charges are stored in correspondence with the amount of light incident on the light-receiving portion of the solid-state image sensing element.

For normal pulse width control, a control signal is output once per storage time in synchronism with the rise or fall of a trigger signal indicating the start of the period (period of time) Hsync as the storage time. When dimming is controlled in synchronism with a signal corresponding to the trigger signal of one storage time, noise due to a beat generated by interference between the storage time and pulse width control for controlling the light amount is removed from an image signal.

As a fluorescent lamp or xenon lamp coated with phosphors and used in an image reading apparatus for reading color image information, a white light source is often employed. In this light source, phosphors of a plurality of colors are mixed and applied to the inner wall of the lamp to simultaneously emit light components of various colors, thereby obtaining light-emitting characteristics in a wide wavelength range across the visible light range.

A white light source has a problem due to the difference in afterglow characteristics unique to the phosphors of different colors. Here, the afterglow characteristics mean that emitted light remains even after the current for controlling light emission of the light source is instantaneously cut off. Afterglow characteristics depend on the time when a phosphor excited by UV rays is staying at a high energy level and generally decrease as an exponential function. Depending on the characteristics of the material of a phosphor, the afterglow characteristics can be represented by $$T = e(\tau - 1)$$

where $\tau$ represents characteristics determined by the material of a phosphor. When phosphors corresponding to R, G, and B colors are mixed, as in a white light source, $\tau$ changes in units of colors. A material used as a phosphor is generally determined on the basis of the light-emitting wavelength characteristics in a wavelength range, luminous efficiency, and service life of the material. Following materials are often used.

Blue: $BaMg_2Al_{16}O_{27}$ (center wavelength 452 nm, T=2 μsec)

Red: $Y_2O_3$: $Eu^{2+}$ (center wavelength 611 nm, T=1.1 msec)

Green: $LaPO_4$: Ce, Tb (center wavelength 544 nm, T=2.6 msec)

T is the attenuation time of each material when the light-emitting amount reaches 1/e due to attenuation.

Since different colors have different afterglow characteristics (especially blue light has a short attenuation time), the barycenter of a read position in the sub-scanning direction changes depending on the color. This phenomenon will be described with reference to FIG. 31.

The abscissa of the graph shown in FIG. 31 represents time, and the ordinate represents the amount of a current for driving a fluorescent lamp and the light-emitting amount of the fluorescent lamp. FIG. 31 shows the model of afterglow generated on the basis of the attenuation characteristics of the R, G, and B colors.

Normally, light amount control (also called dimming control or dimming) of a fluorescent lamp is performed once in the period Hsync corresponding to one storage time of a solid-state image sensing element. The solid-state image sensing element stores charges in proportion to the amount of incident light.

In FIG. 31, the dimming period corresponds to a time when a current for driving the fluorescent lamp is supplied in an amount proportional to the dimming duty. As a technique mainly used, the current is switched to a high frequency during this period.

After the time corresponding to the dimming period, the light-emitting amount decreases. The attenuation characteristics are determined by the following two factors. One is the attenuation characteristics of a bright line spectrum generated by the fluorescent lamp, and the other is the above-described attenuation characteristics of the phosphor.

Normally, one storage time corresponding to the period Hsync is several hundred μsec. A bright line spectrum attenuates for 1 μsec or less and rarely influences. However, a phosphor attenuates on the order of millisecond and considerably influences. Hence, the attenuation characteristics of a light-emitting amount are determined by the sum of the light-emitting amounts of two types and the attenuation characteristics of each light emission.

In a fluorescent lamp turned on by a substantially predetermined current to emit light in a substantially predetermined amount during the dimming period, the light amount corresponding to the bright line spectrum instantaneously decreases when the dimming period is ended. This corresponds to a portion L1. In addition, afterglow corresponding to a portion L2 is generated due to the attenuation characteristics of the fluorescent lamp.

The afterglow characteristics of color light components have the following problem in an image reading apparatus.

One storage time of the solid-state image sensing element serves not only as a reference time in reading image information but also as a reference read position in reading in the sub-scanning direction.

The pixel density in reading image information is determined by the pixel size of the solid-state image sensing element in the main scanning direction, and the moving distance in image reading by mirror scanning in the sub-scanning direction.

Hence, the phenomenon that the light-emitting amounts of color light components have different barycenter positions with respect to the time Hsync because of their afterglow characteristics may be considered by replacing the abscissa of the graph in FIG. 31 with position information.

In FIG. 32, the abscissa is replaced with the distance in the sub-scanning direction. The barycenters (barycenter R and barycenter G) of the read positions of the R and G components in the sub-scanning direction move with respect to the barycenter position (barycenter B) of the B component with the smallest afterglow amount by d2. When the barycenter of the read position in the sub-scanning direction changes in units of colors, color misregistration occurs in reading in the sub-scanning direction to degrade the performance of the image reading apparatus. In an image obtained by reading a thin black line, a phase shift between the R, G, and B signals appears at the edge portion of the thin black line. If color misregistration occurs at the edge portion of the thin black line, the black thin line contained in the original cannot be expressed, and the image quality is degraded.

For an image reading apparatus using a fluorescent lamp or xenon lamp, another technique is examined in which the above-described light amount control is omitted, gain setting of an amplifier for electrically amplifying an output signal from the solid-state image sensing element is changed in accordance with a decrease in light amount due to durability, and an appropriate signal output is obtained by changing the gain in accordance with the decrease in light amount. However, when the gain is changed, the S/N ratio of the read signal varies depending on the value of the gain.

SUMMARY OF THE INVENTION

The present invention has been made to solve the problems of the above-described conventional image reading apparatus, and has as its object to provide an image reading apparatus which reduces the influence of the afterglow characteristics of a light source in reading an original image, and dimming control method and line sensor layout method therefor.

In order to achieve the above object, an image reading apparatus according to the present invention is characterized by the following arrangements.

An image reading apparatus for irradiating an original image with a light source and forming an image corresponding to the original image on an image sensing device through an imaging optical system to read the original image is characterized by comprising control means for shifting an ON start timing of the light source for illuminating the original image from a start timing of a predetermined charge storage period of the image sensing device.

An image reading apparatus for irradiating an original image with a light source and forming an image corresponding to the original image on an image sensing device through an imaging optical system while scanning the original image in main and sub-scanning directions to read the original image is characterized by comprising control means for reducing barycenter movement of read positions of a plurality of color components in the sub-scanning direction, that is generated by afterglow characteristics of the plurality of color components contained in the light source for illuminating the original image.

An image reading apparatus having a white light source containing R (red), G (green), and B (blue) color components with afterglow characteristics different from each other, and line sensors of R, G, and B colors, which are laid out with an offset in a sub-scanning direction, is characterized in that the relative layout of the line sensors of R, G, and B colors is determined on the basis of the afterglow characteristics of the R, G, and B color components of the white light source.

In order to achieve the above object, a dimming control method for an image reading apparatus according to the present invention is characterized by the following arrangements.

A dimming control method for a light source in an image reading apparatus for irradiating an original image with the light source and forming an image corresponding to the original image on an image sensing device through an imaging optical system to read the original image is characterized by comprising a control step of shifting an ON start timing of the light source for illuminating the original image from a start timing of a predetermined charge storage period of the image sensing device.

A dimming control method for a light source in an image reading apparatus for irradiating an original image with the light source and forming an image corresponding to the original image on an image sensing device through an imaging optical system while scanning the original image in main and sub-scanning directions to read the original image is characterized by comprising a control step of reducing barycenter movement of read positions of a plurality of color components in the sub-scanning direction, that is generated by afterglow characteristics of the plurality of color components contained in the light source for illuminating the original image.

In order to achieve the above object, a line sensor layout method for an image reading apparatus according to the present invention is characterized by the following arrangements.

A line sensor layout method in an image reading apparatus having a white light source containing R (red), G (green), and B (blue) color components with afterglow characteristics different from each other, and line sensors of R, G, and B colors, which are laid out with an offset in a sub-scanning direction, is characterized in that the relative layout of the line sensors of R, G, and B colors is determined on the basis of the afterglow characteristics of the R, G, and B color components of the white light source.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 8A and 8B are timing charts for explaining a dimming control method according to the first embodiment of the present invention;

FIGS. 9A and 9B are timing charts for explaining a dimming control method according to the second embodiment of the present invention;

FIG. 25A is a view showing the layout of R, G, and B line sensors employed in the seventh embodiment of the present invention;

FIGS. 25B to 25D are views showing the color misregistration amounts of the R, G, and B line sensors with the layout shown in FIG. 25A;

FIG. 26A is a view showing a layout of R, G, and B line sensors, which is different from that shown in FIG. 25A;

FIGS. 26B and 26D are views showing the color misregistration amounts of the R, G, and B line sensors with the layout shown in FIG. 26A;

DETAILED DESCRIPTION OF THE PREFERRED EMBODIMENTS

(First Embodiment)

Figure 1:
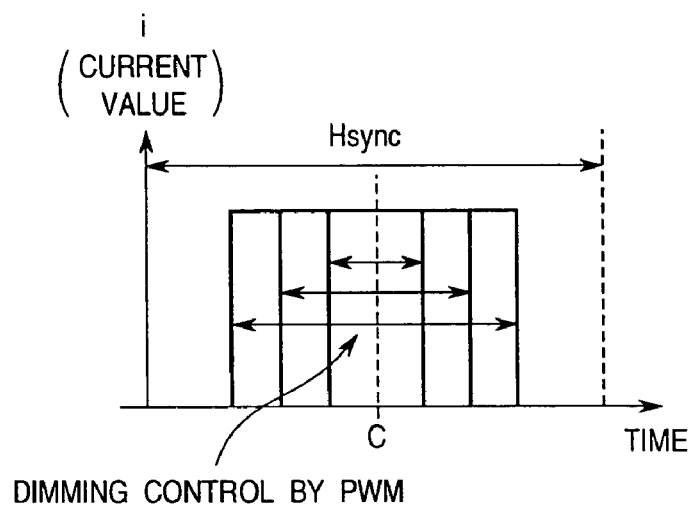
FIG. 1 is a graph for explaining a dimming control method for an image reading apparatus according to the first embodiment of the present invention.
Figure 2:
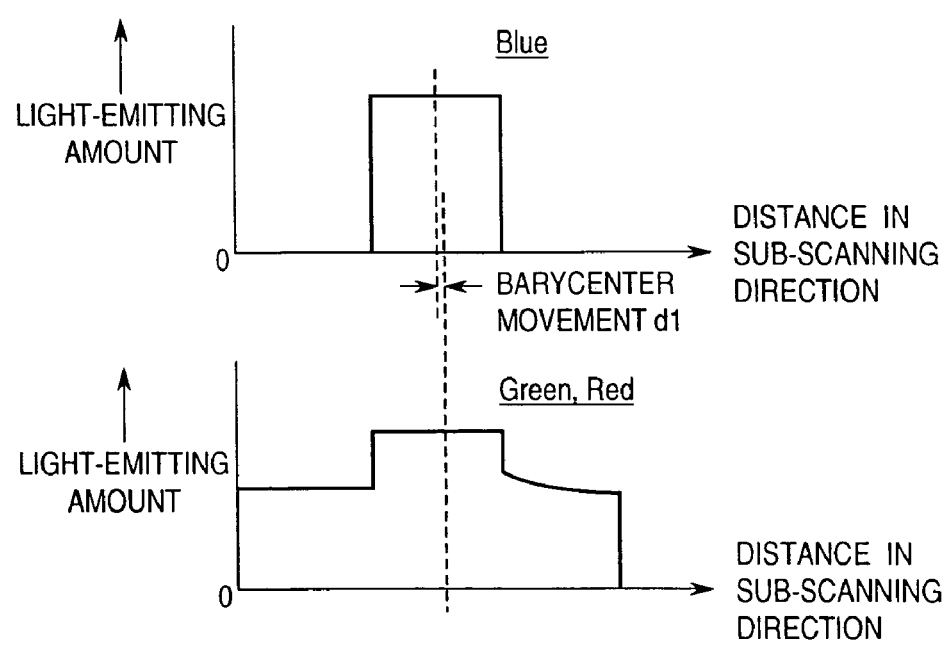
FIG. 2 is a graph for explaining the dimming control method for the image reading apparatus according to the first embodiment of the present invention.
Figure 30:
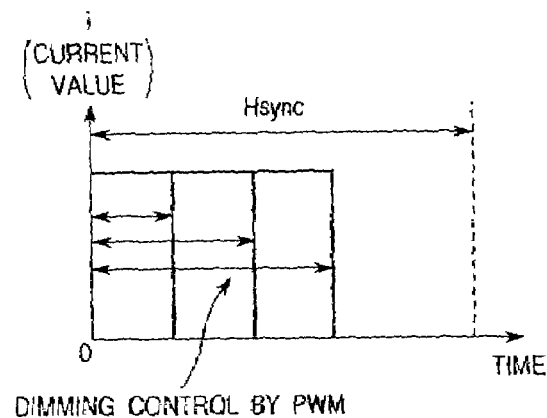
FIG. 30 is a graph for explaining a general dimming control method using pulse-width modulation.
Figure 31:
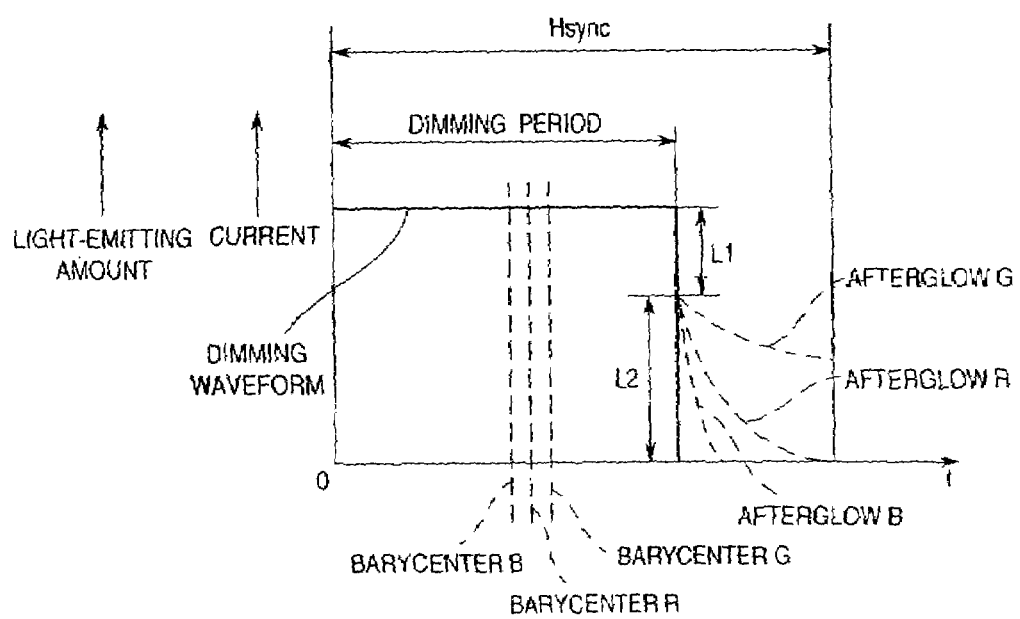
FIG. 31 is a graph for explaining the afterglow characteristics of R, G, and B light sources in the general dimming control method shown in FIG. 30.
Figure 32:
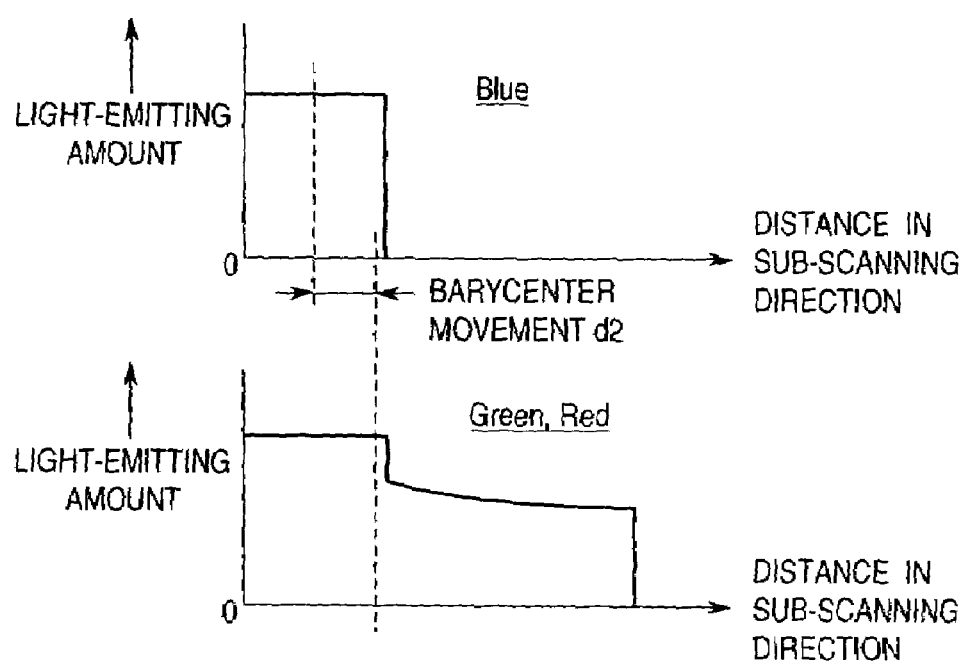
FIG. 32 is a graph for explaining the difference in barycenter position of light-emitting amount between the R, G, and B light sources in the general dimming control method shown in FIG. 30.

FIGS. 1 and 2 are graphs for explaining fluorescent lamp lighting scheme of the first embodiment. In the embodiment, dimming control is performed such that the center of the period (period of time) of dimming by a control signal is placed at the center of a period Hsync, as shown in FIG. 1, unlike the conventional dimming control that is started in synchronism with the rise or fall of a periodical signal indicating the period Hsync (That is, one storage period of time of a solid-state image sensing element), as shown in FIG. 30. In this case, even when the duty of the control signal changes, the central position of the control signal remains at a center reference position C. For this reason, the rise position of the control signal is controlled to be variable in accordance with the duty.

FIG. 2 is a graph showing barycenter movement due to the afterglow characteristics in the control method of the first embodiment. When the light-emitting region is set at the center of the period Hsync, as shown in FIG. 1, the afterglow amount is distributed to the front and rear sides of the light-emitting region and averaged. Barycenter movement d1 due to afterglow is minimum and rarely influences the quality of a read image.

Figure 3:
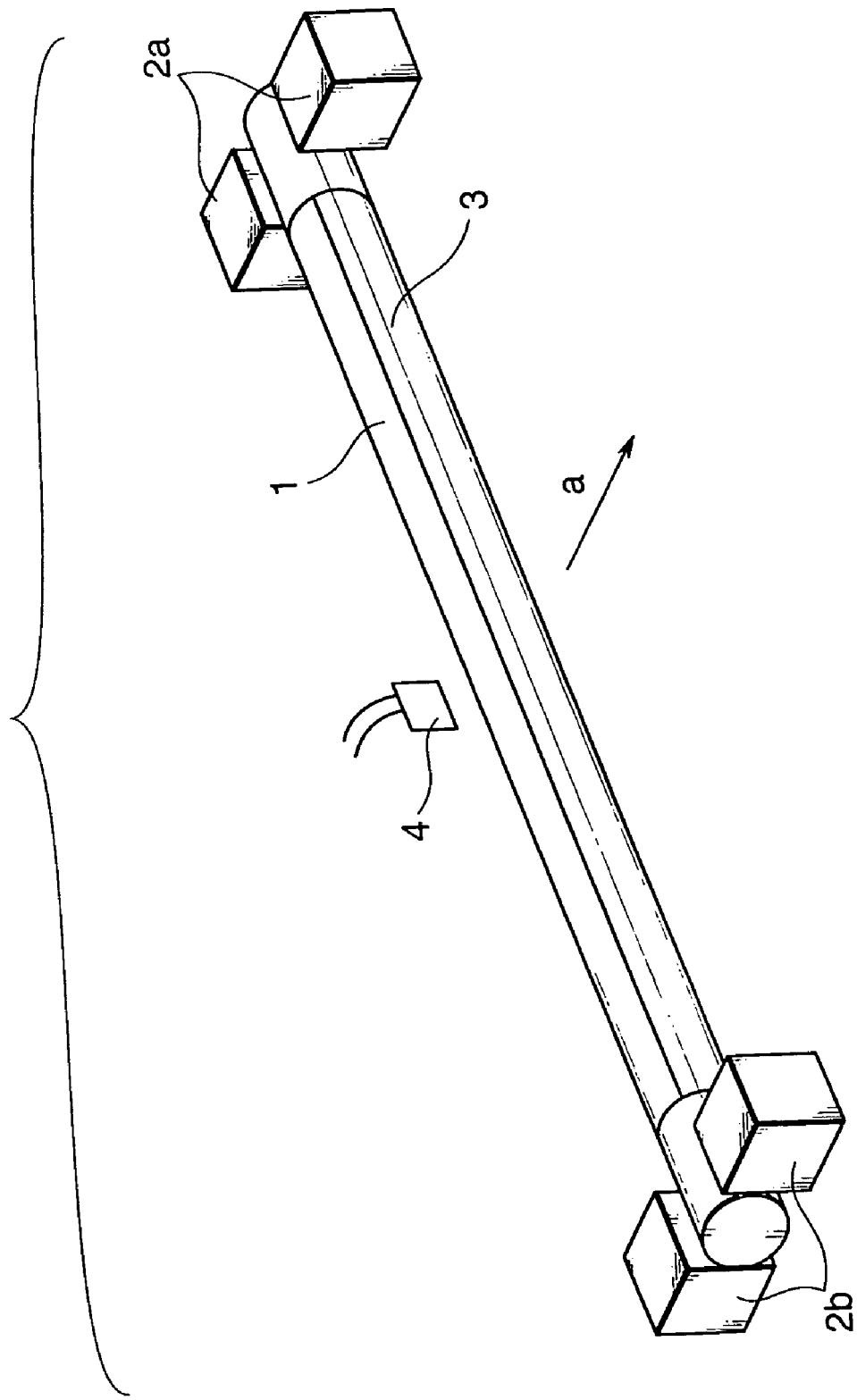
FIG. 3 is a schematic view showing the arrangement of dimming that can be applied to the image reading apparatus according to the first embodiment.

A detailed arrangement for realizing the control method of the first embodiment will be described next. FIG. 3 is a perspective view showing an arrangement around a fluorescent lamp used as a light source of an image reading apparatus of the first embodiment.

As shown in FIG. 3, the two ends of a fluorescent lamp 1 are supported by sockets 2a and 2b. A current is supplied from pins (not shown) of the sockets 2a and 2b. An aperture portion (optical opening) 3 is formed in a predetermined region of the fluorescent lamp 1 to emit strong light in the direction of an arrow a. A region other than the aperture portion 3 emits relatively weak light. A light amount sensor 4 formed from a photodiode or the like is arranged at an appropriate portion of the fluorescent lamp 1 to detect a current corresponding to the amount of light emitted by the fluorescent lamp 1. The light amount is controlled by a light amount controller in accordance with the detected light-emitting amount to make the light amount of the fluorescent lamp almost constant.

Figure 4:
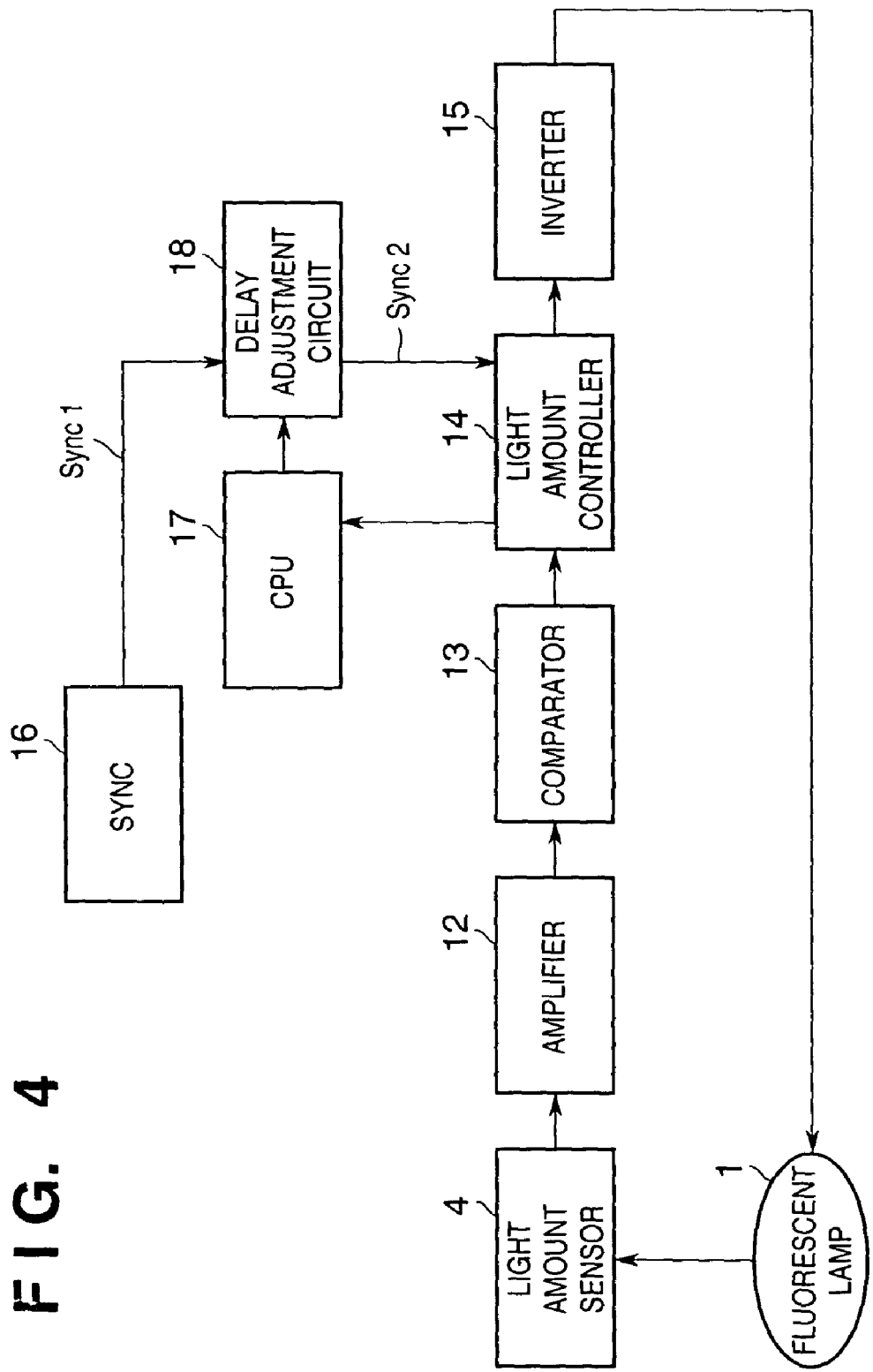
FIG. 4 is a block diagram showing the schematic arrangement of the control unit of the image reading apparatus according to the first embodiment of the present invention.
Figure 5:
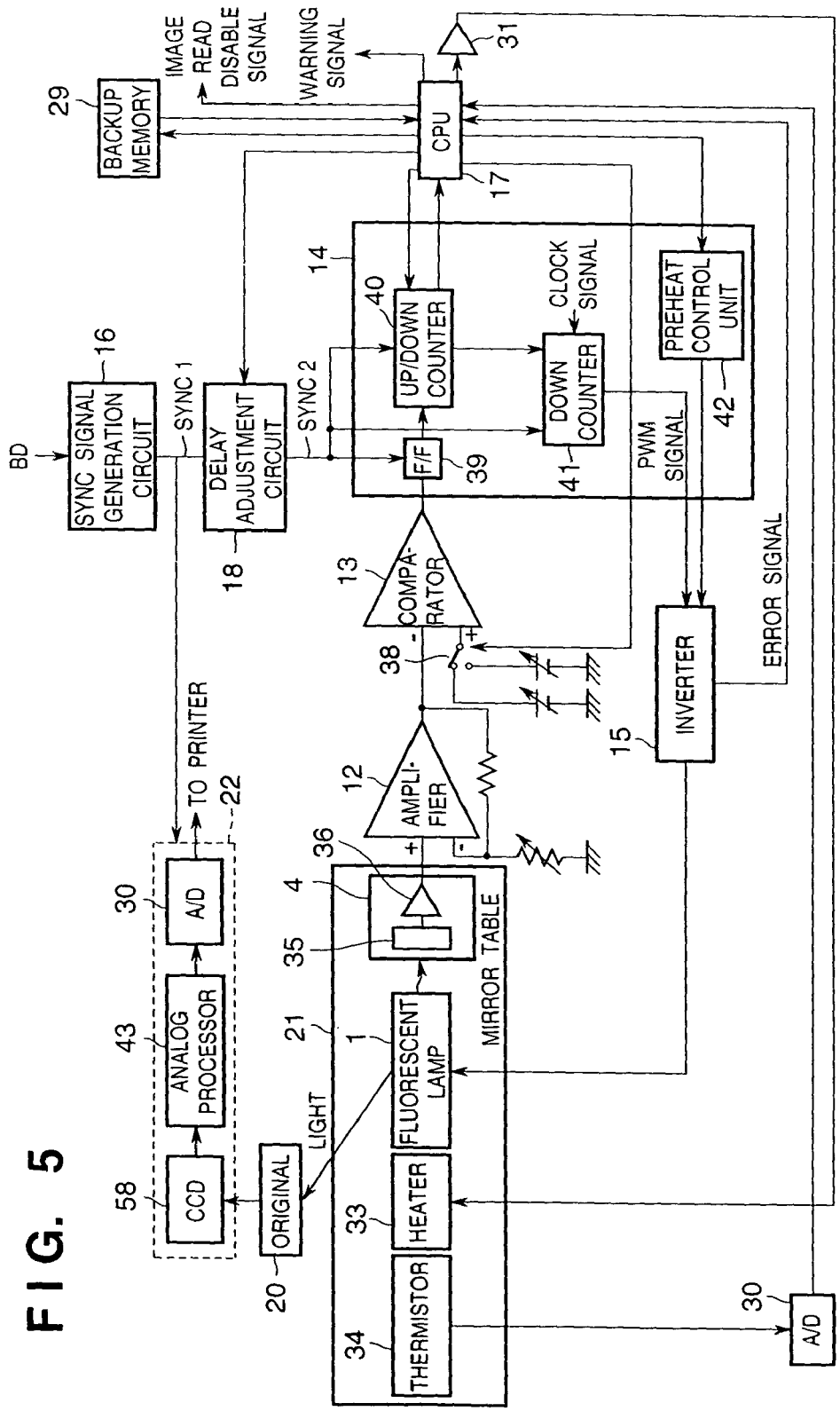
FIG. 5 is a block diagram showing details of the arrangement of the control unit shown in FIG. 4.

FIG. 4 is a block diagram showing the light amount control circuit of the first embodiment. FIG. 5 is a block diagram showing details of the light amount control circuit shown in FIG. 4.

Referring to FIG. 5, an image processing unit 22 has a CCD (Charge-Coupled Device) 58 for receiving an optical signal from an original 20 irradiated with the fluorescent lamp 1 and converting the optical signal into an electrical signal corresponding to the light amount, an analog processor 43 for performing predetermined signal processing for the electrical signal output from the CCD 58, and an A/D converter 30 for converting an analog signal output from the analog processor 43 into a digital signal. The CCD 58 stores charges read in one scanning period as one period of a sync signal. For this reason, an output signal from the CCD 58 has a magnitude obtained by integrating the light amount in one scanning period. When lighting of the fluorescent lamp 1 and scanning by the CCD 58 are synchronized in the same period, a predetermined output range can be obtained. An output from the image processing unit 22 is sent to a printer and printed by the printer.

On a mirror and light unit 21 for irradiating the original, the fluorescent lamp 1, a heater 33 attached to the fluorescent lamp 1, a thermistor 34 attached to the heater 33 to detect the temperature of the heater, and the light amount sensor 4 are disposed. The light amount sensor 4 comprises a photodiode 35 for detecting the light amount of the fluorescent lamp 1 and outputting a light amount signal corresponding to the light amount, and a preamplifier 36 for converting the small current detected by the photodiode 35 into a voltage signal.

The light amount signal output from the light amount sensor 4 is converted into a voltage value and amplified by an amplifier 12. The voltage value amplified by the amplifier 12 is compared with a predetermined reference voltage by a comparator 13, and the comparison result is input to a light amount controller 14. To decrease the light amount when the reflectance of a read image is especially high, the comparator 13 operates a switch 38 on the basis of an instruction from a CPU 17 to switch the reference voltage.

A main-scanning sync signal SYNC1 generated by a sync signal generation circuit 16 is input to a delay adjustment circuit 18. The delay adjustment circuit 18 delays the sync signal SYNC1 by a predetermined delay amount in accordance with an instruction from the CPU 17 and outputs a sync signal SYNC2 to the light amount controller 14.

On the basis of the output result of the comparator 13, the light amount controller 14 outputs a pulse-width modulation (to be referred to as PWM hereinafter) PWM signal phase-locked with a predetermined sync signal (Sync) which has been determined in advance, thereby controlling the duty. The light amount controller 14 comprises a flip-flop (F/F) circuit 39 for outputting a light amount comparison signal from the comparator 13, which is phase-locked with the sync signal SYNC2, an up/down counter 40 for incrementing/decrementing the count value in synchronism with the sync signal SYNC2 on the basis of the light amount comparison signal, a down counter 41 for decrementing the output value from the up/down counter 40 using a predetermined clock phase-locked with the sync signal to generate a PWM signal, and a preheat control unit 42 for preheating the fluorescent lamp 1 before lighting.

The output value from the up/down counter 40 is input to the CPU 17 to read the PWM value at an arbitrary timing. The CPU 17 calculates, in correspondence with the read PWM value, the delay amount of the fluorescent lamp control signal with respect to the periodical signal Hsync, with which the center of the control signal matches the center of the period Hsync, and outputs the calculation result to the delay adjustment circuit 18. The calculation result from the CPU 17 is stored in a backup memory 10.

When the light amount is larger than a predetermined value, i.e., the voltage value output from the amplifier 12 is larger the reference voltage value, the output from the comparator 13, i.e., the output from the F/F 39 becomes zero, and the up/down counter 40 in the light amount controller 14 decrements the count value by a predetermined value. As the count value of the counter becomes small, the load value of the down counter 41 decreases. With this operation, the pulse width of the PWM signal to be input to an inverter 15 narrows to lower the duty ratio. Conversely, when the light amount is smaller than the predetermined value, i.e., the voltage value output from the amplifier 12 is smaller than the reference voltage value, the output from the comparator 13, i.e., the output from the F/F 39 is set at 1. The up/down counter 40 increments the count value by a predetermined value, and the load value of the down counter 41 is incremented. Hence, the pulse width of the PWM signal to be input to the inverter 15 increases to make the duty ratio high. Upon powering on, the duty ratio of the PWM value is set at about 100% to set the light-emitting amount of the fluorescent lamp 1 to have a predetermined value.

When the input PWM signal is at high level, the inverter 15 supplies an AC current (ramp current) having a sufficiently higher frequency (e.g., 10 to 100 times the frequency of the PWM signal) than that of the PWM signal to the fluorescent lamp 1 to turn on the fluorescent lamp 1. When the PWM signal is at low level, the ramp current is cut off to turn off the fluorescent lamp 1. The frequency of the PWM signal is higher than the optical frequency of the fluorescent lamp 1 in the ON or OFF state. Electrically, ON and OFF are repeated in accordance with the period of the PWM signal. Apparently, the fluorescent lamp is turned on to emit light in a substantially predetermined amount corresponding to a current value obtained by averaging the ramp current.

Figure 6:
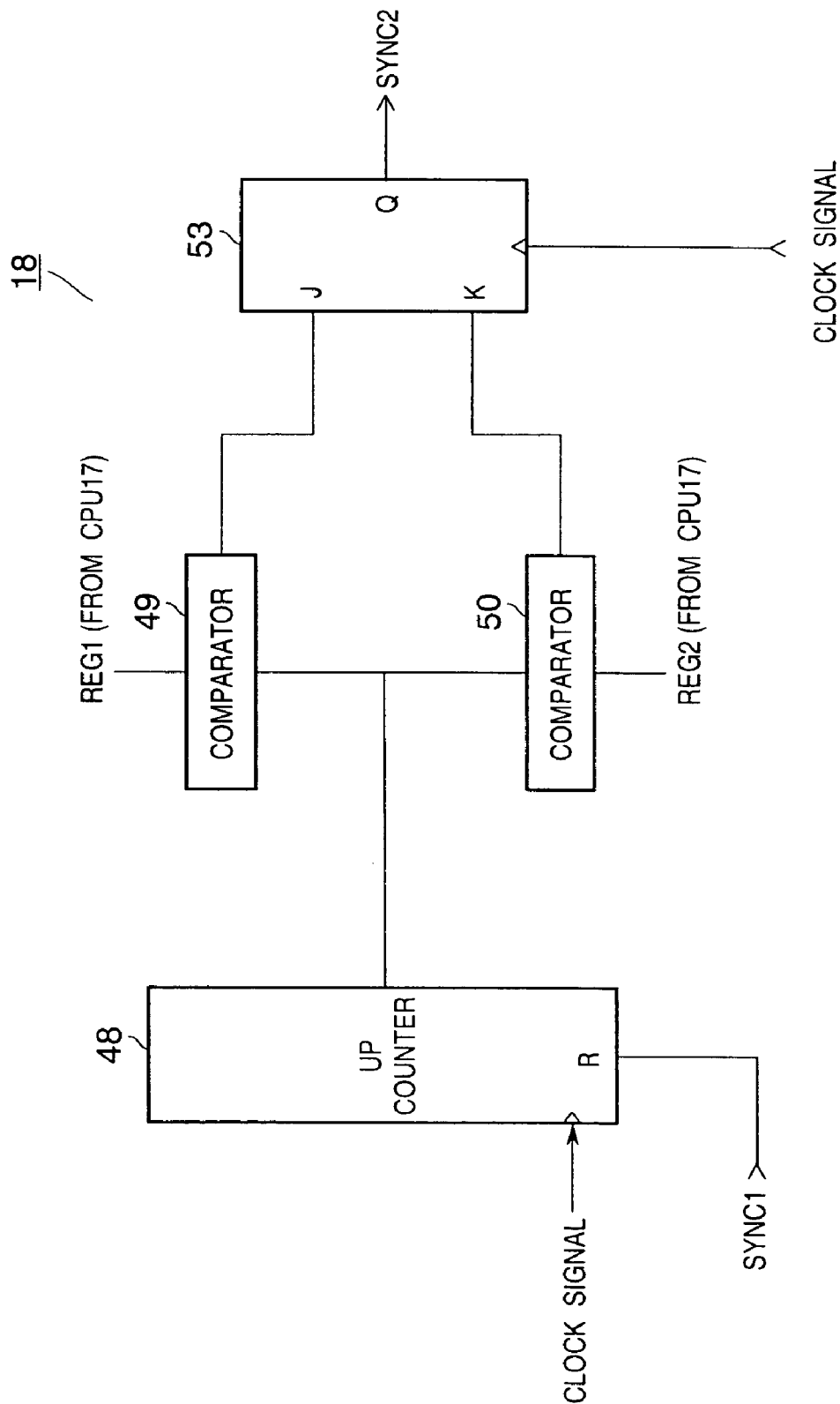
FIG. 6 is a block diagram showing details of a delay adjustment circuit included in the control unit shown in FIG. 4.

FIG. 6 shows a detailed arrangement of the delay adjustment circuit 18. This circuit comprises an up counter 48 for resetting the main-scanning sync signal SYNC1 and incrementing the count value in accordance with a clock signal, comparators 49 and 50 for setting the rise and fall coordinates of the comparators 48 and 50, and a JKF/F 53 for receiving an output from the comparator 49 from the J input terminal and an output from the comparator 50 from the K input terminal and outputting the sync signal SYNC2. For example, for an apparatus in which the number of pixels to be scanned in one main-scanning period is A (A is a predetermined natural number), the rise coordinate is set on the basis of A/2−duty value (%)/200×A, and the fall coordinate is set on the basis of A/2−duty value (%)/200×A+1.

Figure 7:
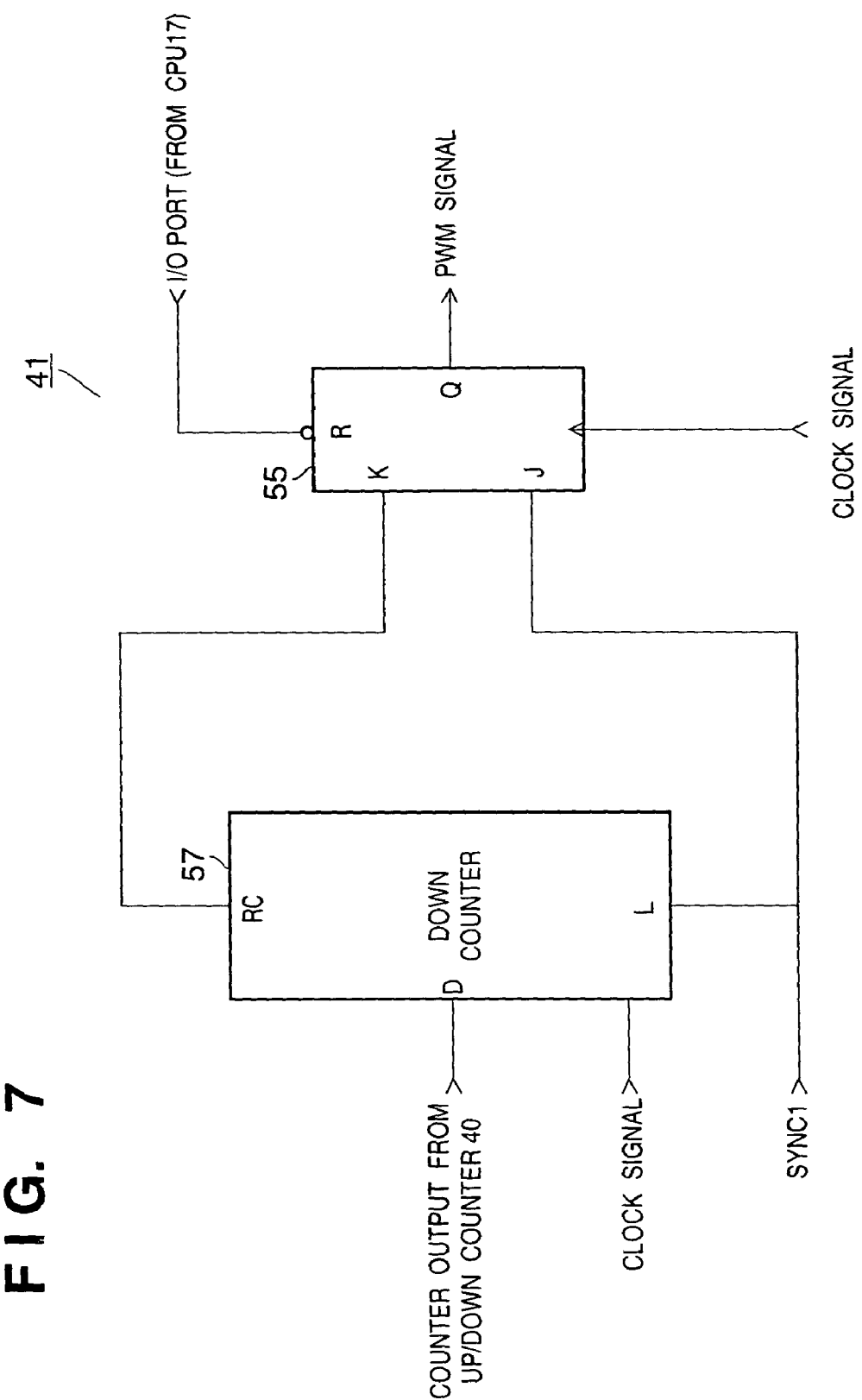
FIG. 7 is a block diagram showing details of a down counter included in the control unit shown in FIG. 4.

FIG. 7 is a block diagram of the down counter 41. The down counter 41 comprises a down counter 57 and a JKF/F 55. The JKF/F 55 receives the sync signal SYNC1 from the J input terminal and a signal RC from the down counter 57 from the K input terminal and outputs the PWM signal. Resetting is done for setting associated with fluorescent lamp control and canceled after regular fluorescent lamp control becomes possible.

Output signals on the circuits shown in FIGS. 4 and 5 will be described next with reference to FIGS. 8A and 8B. Referring to FIGS. 8A and 8B, the abscissa represents time, and the ordinate represents output signals. FIG. 8A shows output signals when the duty value is about 25%. FIG. 8B shows output signals when the duty value is about 60%. Sync1 is a sync signal output from the sync signal generation circuit 16 shown in FIG. 4. This signal is a reference signal for controlling the image read timing, i.e., storage timing of the image sensing element. Sync2 is a sync signal obtained by delaying the sync signal Sync1 by the delay adjustment circuit 18 by a predetermined delay time T in accordance with an instruction from the CPU 17. The delay time input to the delay adjustment circuit 18 is calculated by the CPU 17 on the basis of the duty value output from the light amount controller 14. The method of calculating the delay time T will be described later.

Referring to FIG. 8A, the delay time from rise time t1 of the sync signal Sync1 to fall time t2 of the sync signal Sync2 is represented by A1. The delay time A1 can be calculated by the CPU 17 on the basis of the duty value from the light amount controller 14 using equation (1):

$$T = S \times (100 - \text{duty})/2 \tag{1}$$

where T is the delay time, S is the Hsync period corresponding to one storage time, and duty is the duty value represented in percentage. The PWM signal as a light source driving pulse signal output from the light amount controller 14 is output at fall time t2 of the delayed sync signal Sync2, and the PWM signal of high level is continuously output during a period corresponding to the duty value. The inverter 15 supplies a tube current having a frequency sufficiently higher than that of the PWM signal to the fluorescent lamp 1 on the basis of the PWM signal. In response to this tube current, the fluorescent lamp 1 is turned on to emit light in a substantially predetermined amount corresponding to a current value as the average of the tube current. At this time, a line C at the center of the PWM signal, tube current, and light amount signal in the ON state of the fluorescent lamp matches the center of the period of the sync signal Sync1 from the fall to the next fall, that corresponds to one storage time of the solid-state image sensing element.

Referring to FIG. 8B as well, the center C of the PWM signal, tube current, and light amount signal matches the center of the periodical signal Sync1. In FIG. 8B, the duty value is about 60%. A delay time B1 from fall time t3 of the sync signal Sync1 to fall time t4 of the sync signal Sync2 is calculated from equation (1). When the duty value becomes large, the delay time B1 become shorter than the delay time A1 shown in FIG. 8A.

As described above, in this embodiment, the image read timing is controlled such that the central position of the ON control signal (PWM signal) is always located almost at the center of the period of the signal Hsync by shifting the phase of the sync signal Sync2 for controlling the timing of the PWM signal, i.e., the fluorescent lamp ON/OFF timing from that of the sync signal Sync1. With this arrangement, the central position of the ON control signal can be prevented from changing over time even when the duty value of the PWM signal is changed. Even when the afterglow characteristics of phosphors change in units of colors, the barycenter position of the light amount can always be located near the center of the periodical signal Hsync. Hence, the light amount of afterglow in the OFF period can be averaged near the ON period in one storage time, and the change in barycenter position can be minimized.

(Second Embodiment)

A fluorescent lamp lighting method according to the second embodiment of the present invention will be described with reference to FIGS. 9A and 9B. A detailed description of the same arrangements as in the first embodiment will be omitted, and characteristic portions will be mainly described.

Referring to FIGS. 9A and 9B, the abscissa represents time, and the ordinate represents output signals. FIG. 9A shows output signals when the duty value is about 25%. FIG. 9B shows output signals when the duty value is about 60%.

In the second embodiment, the PWM signal in dimming changes symmetrically with respect to the center of the fall timing of a sync signal Sync1. Sync1 represents a sync signal output from a sync signal generation circuit 16 of the present invention shown in the block circuit of FIG. 4 and controls the read timing, i.e., storage timing. Sync2 represents a sync signal obtained by delaying the sync signal Sync1 by a delay adjustment circuit 18 in accordance with an instruction from a CPU 17 on the basis of the duty value from a light amount controller 14. The delay time from fall time t5 of the sync signal Sync1 to fall time t6 of the sync signal Sync2 is represented by A2. The delay time A2 can be calculated from equation (2) on the CPU 17 using the duty value from the light amount controller 14.

$$T = S \times (100 - duty/2) \quad (2)$$

where T is the delay time, S is the Hsync period corresponding to one storage time, and duty is the duty value represented in percentage. The PWM signal output from the light amount controller 14 is output at fall time t6 of the delayed sync signal Sync2, and the PWM signal of high level is continuously output during a period corresponding to the duty value. An inverter 15 supplies a tube current having a frequency sufficiently higher than that of the PWM signal to a fluorescent lamp 10 on the basis of the PWM signal. In response to this tube current, the fluorescent lamp 10 is turned on to emit light in a substantially predetermined amount corresponding to a current value as the average of the tube current. At this time, time t5 at the center of the PWM signal, tube current, and light amount signal in the ON state of the fluorescent lamp matches the fall of the period of the sync signal Sync1, i.e., the read end timing (storage end timing), that corresponds to one storage time of the solid-state image sensing element.

Referring to FIG. 9B as well, time t7 of the PWM signal, tube current, and light amount signal matches the fall of the period of the sync signal Sync1, i.e., the read end timing (storage end timing), that corresponds to one storage time of the solid-state image sensing element. In FIG. 9B, the duty value is about 60%, and a delay time B2 from fall time t3 of the sync signal Sync1 to fall time t4 of the sync signal Sync2 is calculated from equation (2). When the duty value becomes large, the delay time B2 becomes shorter than the delay time A2.

As described above, in the second embodiment, the central position of the ON control signal (PWM signal) can be prevented from changing over time and is always located at the fall time of the periodical signal Hsync even when the duty value of the PWM signal is changed. Even when the afterglow characteristics of phosphors change in units of colors, the barycenter position of the light amount can be located near the center of the period of the periodical signal Hsync. Hence, the light amount of afterglow in the OFF period can be averaged near the ON period in one storage time, and the change in barycenter position can be minimized.

In the second embodiment, control is performed to locate the central position of the ON control signal at the fall timing of the sync signal Sync1. However, the present invention is not limited to this, and control may be performed to match the central position of the ON control signal with the rise of the sync signal Sync1, i.e., the read start timing (storage start timing). If dimming of the light source is unnecessary, the duty value of the ON control signal need not always be changed. A method other than the method described above may be used to reduce afterglow and suppress movement of the barycenter position for each color due to the influence of afterglow. Even when a light source other than a fluorescent lamp is used, the shift of barycenter position due to afterglow can be decreased by the same method as described above. In addition, this embodiment can also be applied to a system which sequentially turns on a plurality of light sources with colors.

(Third Embodiment)

A detailed description of the same arrangements as in the first embodiment will be omitted, and characteristic portions will be mainly described.

Figure 10:
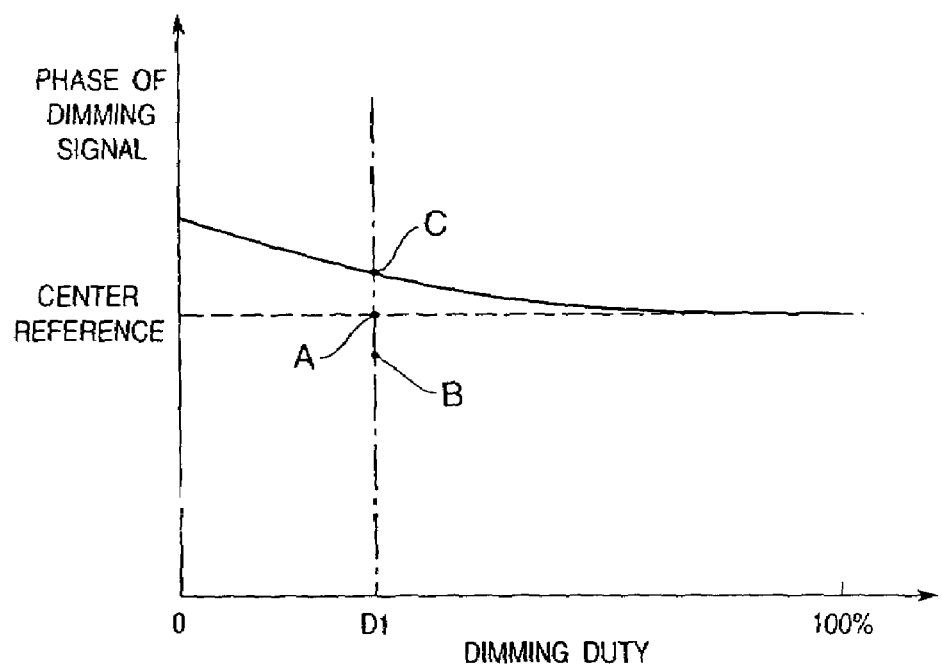
FIG. 10 is a graph for explaining a dimming control method for an image reading apparatus according to the third embodiment of the present invention.

FIG. 10 is a graph for explaining the operation of an image reading apparatus according to the third embodiment. The schematic arrangement of the optical system of this embodiment is the same as in FIG. 3, and a detailed description thereof will be omitted.

Referring to FIG. 10, the abscissa represents the dimming duty of a dimming signal for dimming a light source such as a fluorescent lamp, and the ordinate represents the phase of the dimming signal in one storage time of a solid-state image sensing element.

As the characteristic feature of the third embodiment, the phase of the dimming signal in one storage time of the solid-state image sensing element can be changed in accordance with the dimming duty (duty value of the PWM signal) such that barycenter movement of the read position for each color due to the influence of the afterglow characteristics of a phosphor, or the like is minimized.

As described above in the first and second embodiments, the influence of barycenter movement of the read position due to the afterglow characteristics of the light source such as a fluorescent lamp can be reduced by controlling the phase of the dimming signal and setting the center of a light-emitting pulse corresponding to the fluorescent lamp driving pulse at the central position of one storage time of the solid-state image sensing element.

However, if the phase of the dimming signal is only fixed at the center of a predetermined storage time (Sync1) of the solid-state image sensing element, small barycenter movement may occur.

Figure 11:
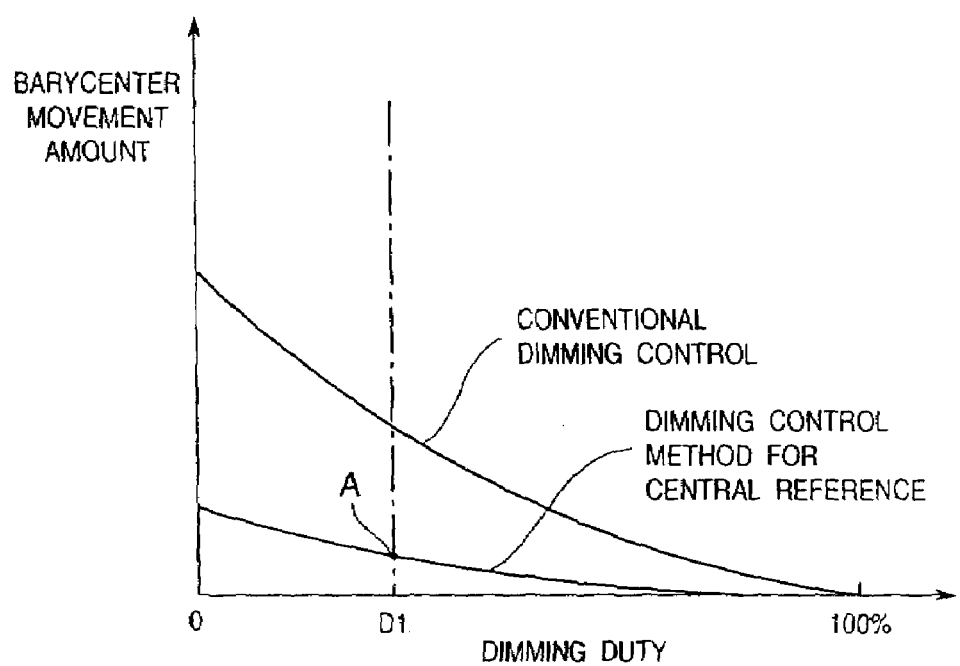
FIG. 11 is a graph in which the barycenter moving amount of an image read position in the dimming control method of the third embodiment of the present invention is compared with that in a conventional dimming control method.

As shown in FIG. 11, barycenter movement of the read position due to the dimming duty varies depending on the dimming duty amount.

As in apparent from FIG. 11, when the dimming duty is small, barycenter movement of the read position as the variation is large. As the dimming duty is close to 100%, the barycenter movement becomes small.

This variation is improved when the phase of the dimming signal is generated symmetrically with respect to the center of one storage time along the time axis, as shown in FIG. 11, though slight barycenter movement remains.

Figure 12A:
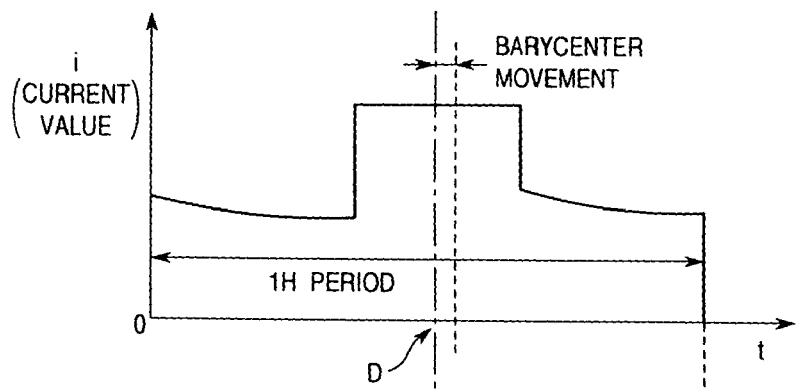
FIG. 12A and 12C are graphs for explaining the relationship between the phase of a dimming signal and barycenter movement of the image read position in the third embodiment of the present invention.
Figure 12B:
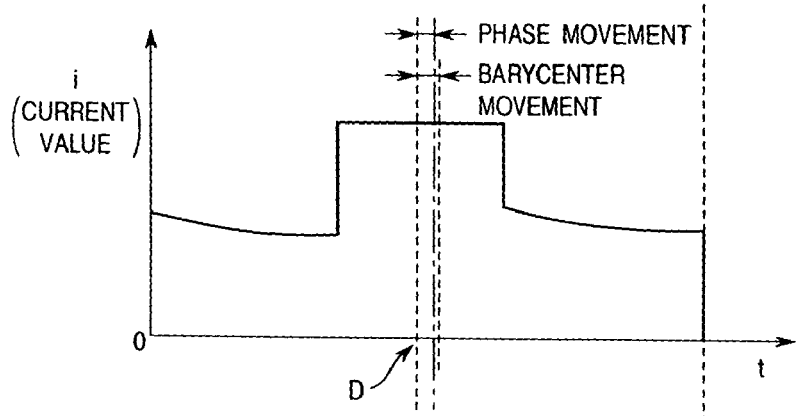
Figure 12C:
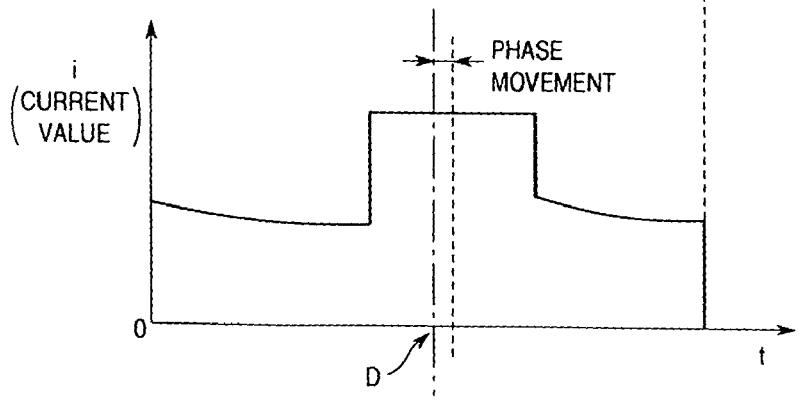

FIGS. 12A to 12C show the relationship between the phase of the dimming signal and barycenter movement of the image read position.

FIG. 12A shows barycenter movement of a light-emitting waveform at a predetermined duty in the dimming control method of generating a dimming signal along the time axis symmetrically with respect to the center of one storage time of the solid-state image sensing element.

The duty value corresponds to D1 in FIG. 10. Since the control is performed using the center of one storage time as a reference, the phase of the dimming signal corresponds to A in FIG. 10. Referring to FIG. 12A, the center of one storage time of the solid-state image sensing element corresponds to a line D (alternate long and short dashed line). At this time, referring to FIG. 11, when the duty is represented by D1, barycenter movement of the read position in dimming control for the center reference is represented by A, and barycenter movement of the read position remains, as shown in FIG. 12A.

FIG. 12B shows barycenter movement of a light-emitting waveform when the phase is slightly led with respect to the phase for the center reference in FIG. 12. The phase of a dimming signal at this time corresponds to B in FIG. 10.

When the phase of the dimming signal is led, the effect of control for the center reference decreases to close to the conventional dimming control state described in "BACKGROUND OF THE INVENTION". Hence, the residual barycenter movement amount becomes larger than that in FIG. 12A.

FIG. 12C shows barycenter movement of a light-emitting waveform when the phase is slightly delayed with respect to the phase for the center reference in FIG. 12A. The phase of a dimming signal at this time corresponds to C in FIG. 10.

Since the effect of control for the center reference is increased by delaying the phase of the dimming signal, the residual barycenter movement amount can be made zero. More specifically, when the phase is controlled as shown in FIG. 12C, the residual barycenter movement amount can be eliminated. By calculating the delay amounts of the dimming signal for the respective duties in advance, the residual barycenter movement amount can be made zero for any duty.

The curve in FIG. 10 represents the delay amount with which the barycenter movement amount becomes zero for the respective duties. The smaller the dimming duty is, the larger the delay amount from the phase as the center reference becomes.

The delay amount from the phase as the center reference for each duty is obtained in advance by calculation or measurement. When this correspondence is stored on a storage medium such as a backup memory 29 of the image reading apparatus in advance, correction becomes easy.

An arrangement for realizing the control scheme of this embodiment will be described next.

The third embodiment is different from the first embodiment in the following points.

For example, for an apparatus in which the number of pixels to be scanned in one main scanning period is A (A is a predetermined natural number), the rise coordinate is set on the basis of $A/2$−duty value (%)/$200 \times A + B$(duty)

The fall coordinate is set on the basis of $A/2$−duty value (%)/$200 \times A + B$(duty)$+1$ where B(duty) is an arbitrary delay amount determined by the duty. This value is determined by the number of pixels to be shifted from the center of one storage time to minimize barycenter movement of the read position.

A delay time T is given by $$T = S1 \times (100 - \text{duty value})/2 + S2 \quad (3)$$

where T is the delay time, S1 is a period Hsync corresponding to one storage time, duty is the duty value represented in percentage, and S2 is an arbitrary delay amount set in correspondence with the duty.

The delay amounts to be employed as B(duty) and S2 are stored in the backup memory 29 or the like in advance in correspondence with duty values, and a delay amount corresponding to the current duty is read out from the stored values.

When the control method of the third embodiment is employed, barycenter movement of the read position can be further reduced as compared to the first embodiment.

(Fourth Embodiment)

In the fourth embodiment, pulse output delay control described in the above third embodiment is applied to the image reading apparatus described in the second embodiment.

In this case, a delay time T is given by $$T = S1 \times (100 - \text{duty value})/2 + S2 \quad (4)$$

where T is the delay time, S1 is the period Hsync corresponding to one storage time, duty is the duty value represented in percentage, and S2 is an arbitrary delay amount set in correspondence with the duty.

By employing delay control with such calculation, the barycenter position change amount can be further reduced as compared to the second embodiment.

(Fifth Embodiment)

Figure 13:
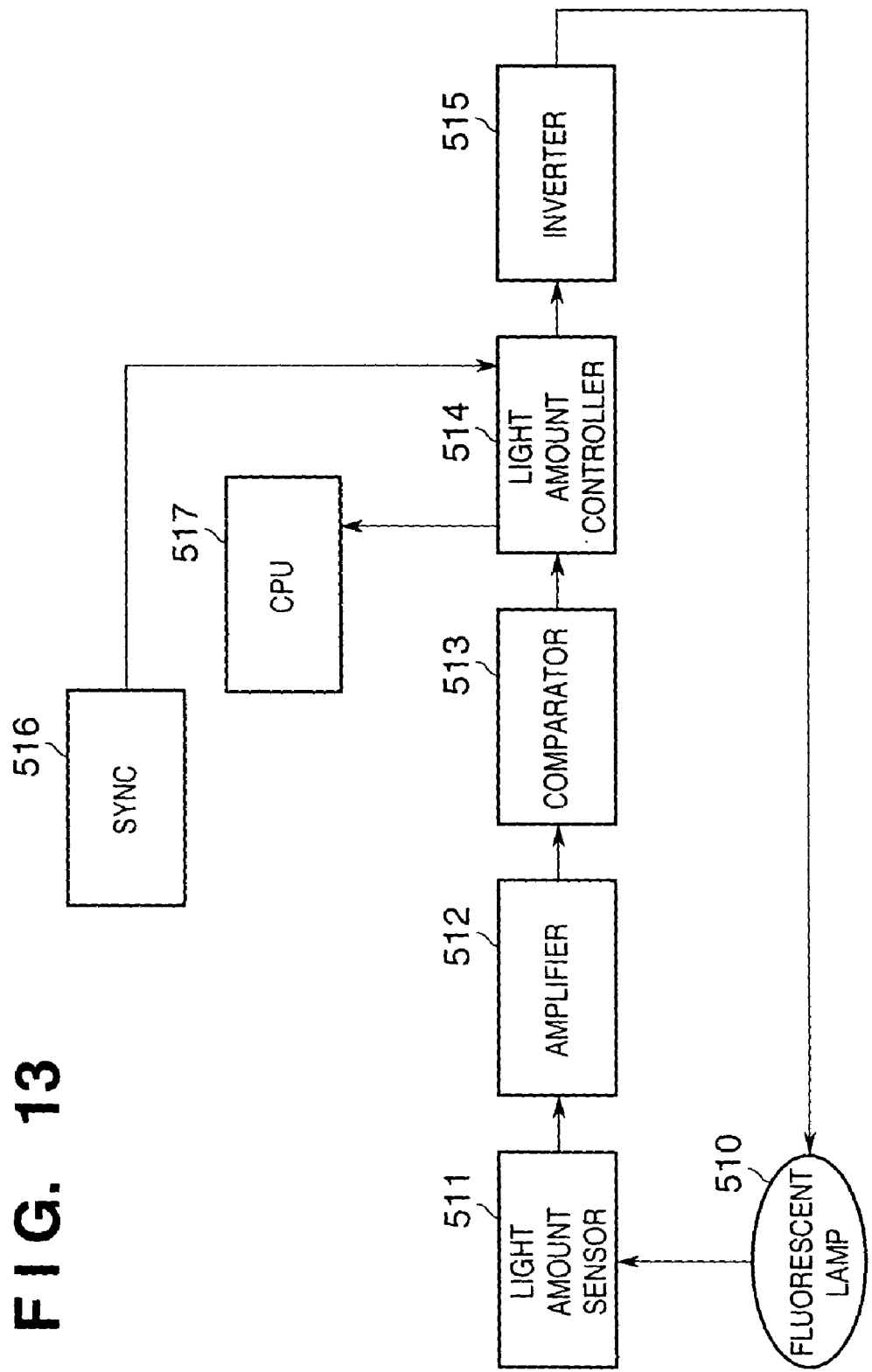
FIG. 13 is a block diagram showing the schematic arrangement of the control unit of an image reading apparatus according to the fourth embodiment of the present invention.

FIG. 13 is a block diagram of a light amount control system according to the fourth embodiment.

A light amount sensor 511 detects the light amount of a fluorescent lamp 510 and outputs a light amount signal corresponding to the light amount. The light amount is converted into a voltage value and amplified by an amplifier 512.

The amplified voltage value is compared with a predetermined reference voltage by a comparator 513. The comparison result is input to a light amount controller 514.

The light amount controller 514 outputs a pulse-width modulation (to be referred to as PWM hereinafter) signal as shown in FIG. 1 to an inverter 515, which is phase-locked with a sync signal (Sync), thereby performing duty control. More specifically, when the voltage value output from the amplifier 512 is larger than the reference voltage value, a PWM signal is output to lower the duty ratio. Conversely, when the voltage value output from the amplifier 512 is smaller than the reference voltage value, a PWM signal is output to raise the duty ratio. A duty value to be set in the inverter 515 is output from the light amount controller 514 to a CPU 517.

When the PWM signal input to the inverter 515 is at high level, the inverter 515 supplies an AC current, i.e., a ramp current having a frequency sufficiently higher (e.g., frequency of 10 to 100 times the frequency of the PWM signal) than that of the PWM signal to the fluorescent lamp 510 to turn on the fluorescent lamp 510. When the PWM signal is at low level, the inverter 515 cuts off the ramp current to turn off the fluorescent lamp 510.

The frequency of the PWM signal is higher than the optical frequency of the fluorescent lamp 510 in the ON or OFF state. Electrically, ON and OFF are repeated in accordance with the period of the PWM signal. Apparently, the fluorescent lamp is turned on to emit light in a substantially predetermined amount corresponding to a current value obtained by averaging the ramp current.

The arrangement of an image reading apparatus according to the fifth embodiment, which uses the above light amount control arrangement, will be described below.

Figure 14:
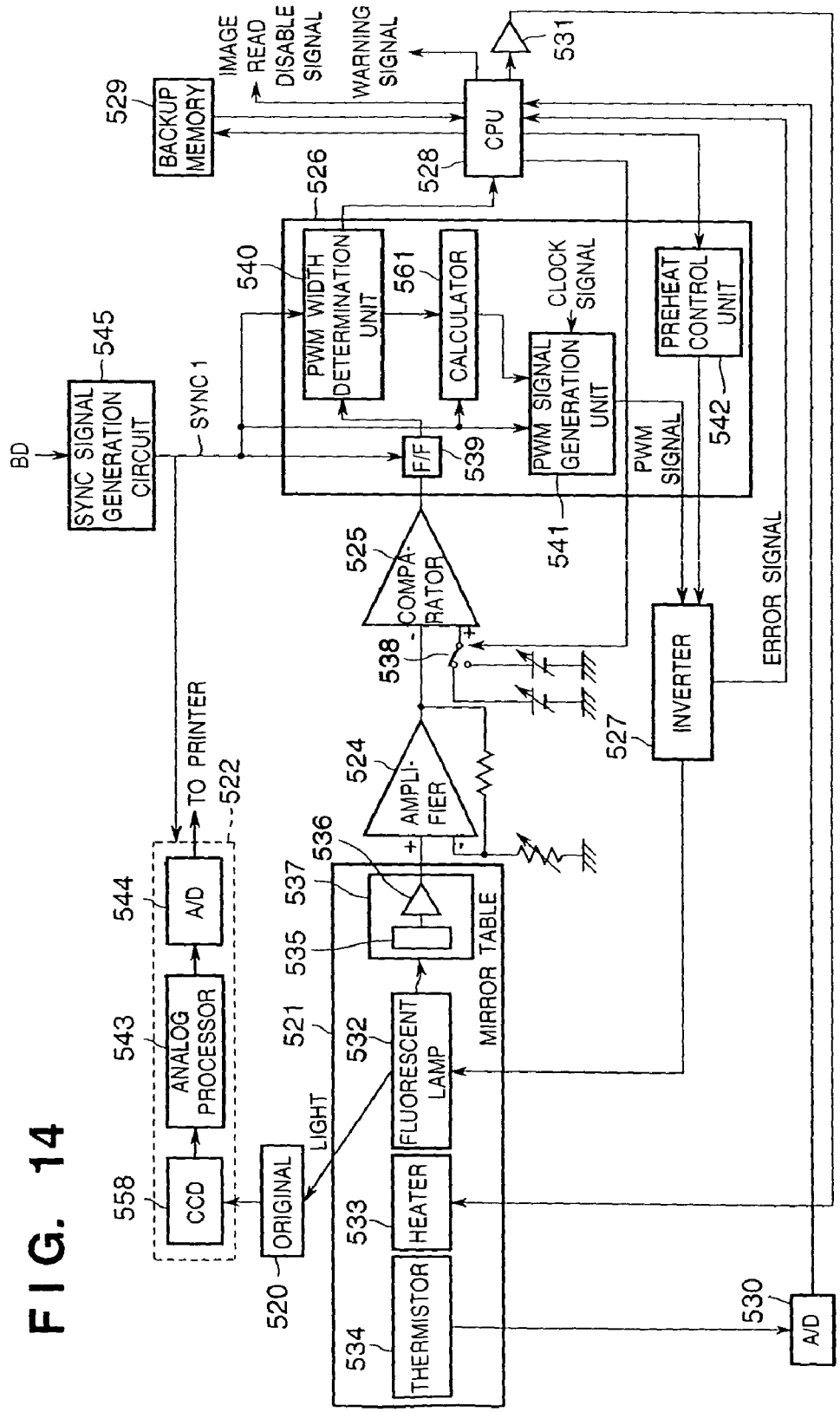
FIG. 14 is a block diagram showing details of the arrangement of the control unit shown in FIG. 13.

FIG. 14 is a block diagram showing the arrangement of the image reading apparatus according to the fifth embodiment. As shown in FIG. 14, the apparatus comprises a mirror and light unit 521 for irradiating an original 520 with light, an image processing unit 522 for performing predetermined image processing for an optical signal from the original 520 and outputting the signal to a printer, an amplifier 524 for amplifying the output signal from the mirror and light unit 521, a comparator 525 for comparing the output signal from the amplifier 524 with a reference signal and outputting the comparison result, a light amount controller 526 formed from, e.g., an ASIC for controlling the light amount on the basis of the output result from the comparator 525 and outputting a PWM signal phase-locked with a predetermined sync signal, an inverter 527 for turning on the lamp on the basis of an instruction from the light amount controller 526, a CPU 528 for controlling the entire apparatus, and a backup memory 529 for storing a calculation result from the CPU 528, and the like. Reference numeral 544 denotes and A/D converter; and 545, a circuit for generating a free-running main scanning sync signal (SYNC) and selecting for selecting one of the main scanning sync signal and a printer main scanning sync signal BD.

The mirror and light unit 521 comprises a fluorescent lamp 532, a heater 533 attached to the fluorescent lamp 532, a photodiode 535 attached to the fluorescent lamp 532, to detect the light amount of the fluorescent lamp 532, and a light amount sensor 537 having the photodiode 535 and a preamplifier 536 for converting a microcurrent detected by the photodiode 535 into a voltage signal.

The amplifier 524 receives a voltage signal output from the preamplifier 536 and a voltage signal from a rheostat 523 and amplifies the light amount signal to a predetermined value.

To reduce the light amount when the reflectance of the read image is particularly high, the comparator 525 initialize a switch 538 on the basis of an instruction from the CPU 528 to allow switching the reference voltage.

The light amount controller 526 comprises a flip-flop (F/F) circuit 539 for outputting a light amount comparison signal from the comparator 525, which is phase-locked with a sync signal, a PWM width determination unit 540 for incrementing/decrementing a counter value in accordance with the light amount comparison signal and sync signal (SYNC1) to determine the PWM width, a PWM signal generation unit 541 for outputting a PWM signal having a PWM width determined at a predetermined position and phase-locked with a sync signal (SYNC1), a calculator 561 for obtaining a set value to be set in the PWM signal generation unit 541 using the ouput value, i.e., the PWM width value from the PWM width determination unit 540, and a preheat control unit 542 for preheating the fluorescent lamp 532 before it is turned on.

The PWM width determination unit 540 is formed from an up/down counter. When the voltage value input to the comparator 525 is larger than the reference voltage value, the count value is decremented to make the count value small, i.e., the duty ratio low. When the voltage value input to the comparator 525 is smaller than the reference voltage value, the count values is incremented to make the count value large, i.e., the duty ratio high.

The output value from the PWM width determination unit 540 is input to the CPU 528. The CPU 528 reads the PWM value at an arbitrary timing.

The operation of the light amount controller 526 will be described. When the light amount is larger than a predetermined value, the output from the comparator 525, i.e., the output form the F/F 539 is set at 0. The output from the PWM width determination unit 540 is decreased by a predetermined value, and consequently, the PWM signal (pulse width) to be input to the inverter 527 is narrowed. Conversely, when the output value is smaller than the predetermined value, the output from the comparator 525, i.e., the output from the F/F/ 539 is set at 1. The output from the PWM width determination unit 540 is increased by a predetermined value to increase the PWM width value. As a result, the PWM value (pulse width) to be input to the inverter 527 is increased.

Upon powering on, the duty ratio is set at about 100% to cause the fluorescent lamp 510 to emit light in a predetermined light amount.

When the PWM signal input to the inverter 527 is at high level, the inverter 527 supplies an AC current (ramp current) having a sufficiently higher frequency (e.g., 10 to 100 times the frequency of the PWM signal) than that of the PWM signal to the fluorescent lamp 532 to turn on the fluorescent lamp 532. When the PWM signal is at low level, the ramp current is cut off to turn off the fluorescent lamp 532. Electrically, ON and OFF are repeated in accordance with the period of the PWM signal. Apparently, the fluorescent lamp is turned on to emit light in a substantially predetermined amount corresponding to a current value obtained by averaging the ramp current.

The image processing unit 522 has a CCD 558 for receiving an optical signal from the original 520 and converting the signal into an electrical signal, an analog processor 543 for receiving the electrical signal output from the CCD 558 and performing predetermined signal processing and the A/D converter 544 for converting the analog signal output from the analog processor 543 into a digital signal. The CCD 558 stores charges read in one scanning period as one period of a sync signal. Hence, an output signal from the CCD 558 has a magnitude obtained by integrating the light amount in one scanning period. When lighting of the fluorescent lamp 532 and scanning by the CCD 558 are synchronized in the same period, a predetermined output can be obtained.

Figure 15:
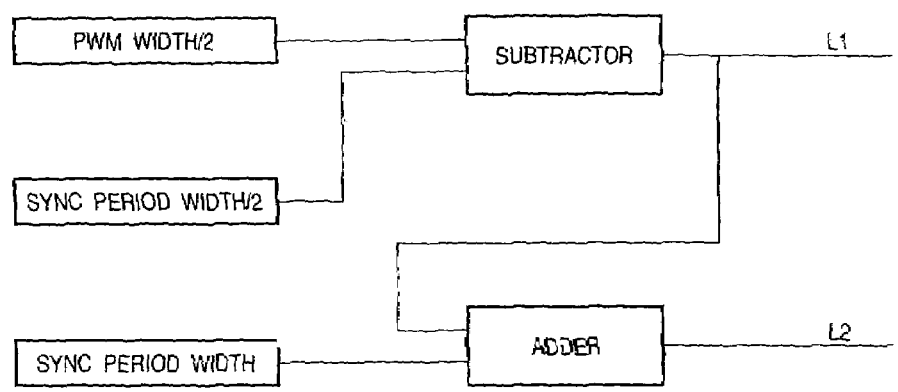
FIG. 15 is a block diagram showing details of a calculator included in the control unit shown in FIG. 13.
Figure 16:
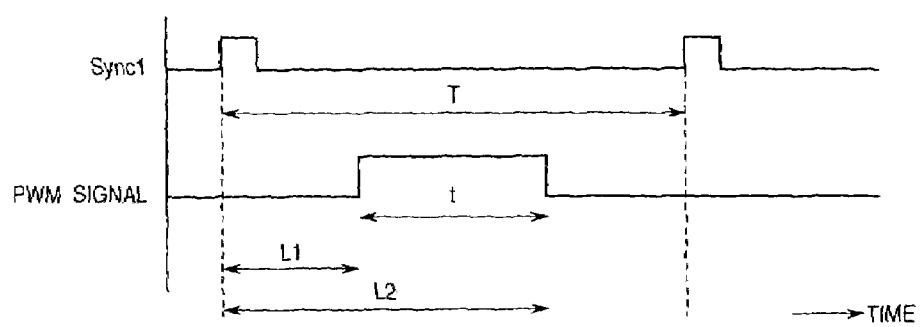
FIG. 16 is a timing chart for explaining the operation of the calculator shown in FIG. 15.

FIG. 15 is a block diagram of the calculator 561. FIG. 16 is a timing chart of the operation of the calculator. The timing chart shown in FIG. 16 will be described. A desired pulse width (t) is obtained by the PWM width determination unit 540. As described above, the pulse must be located at the center of one sync signal (one SYNC period: time T). For this purpose, the calculator 561 calculates $L1 = T/2 - t/2$ $L2 = L1 + t$ and outputs the results, L1 and L2.

Figure 17:
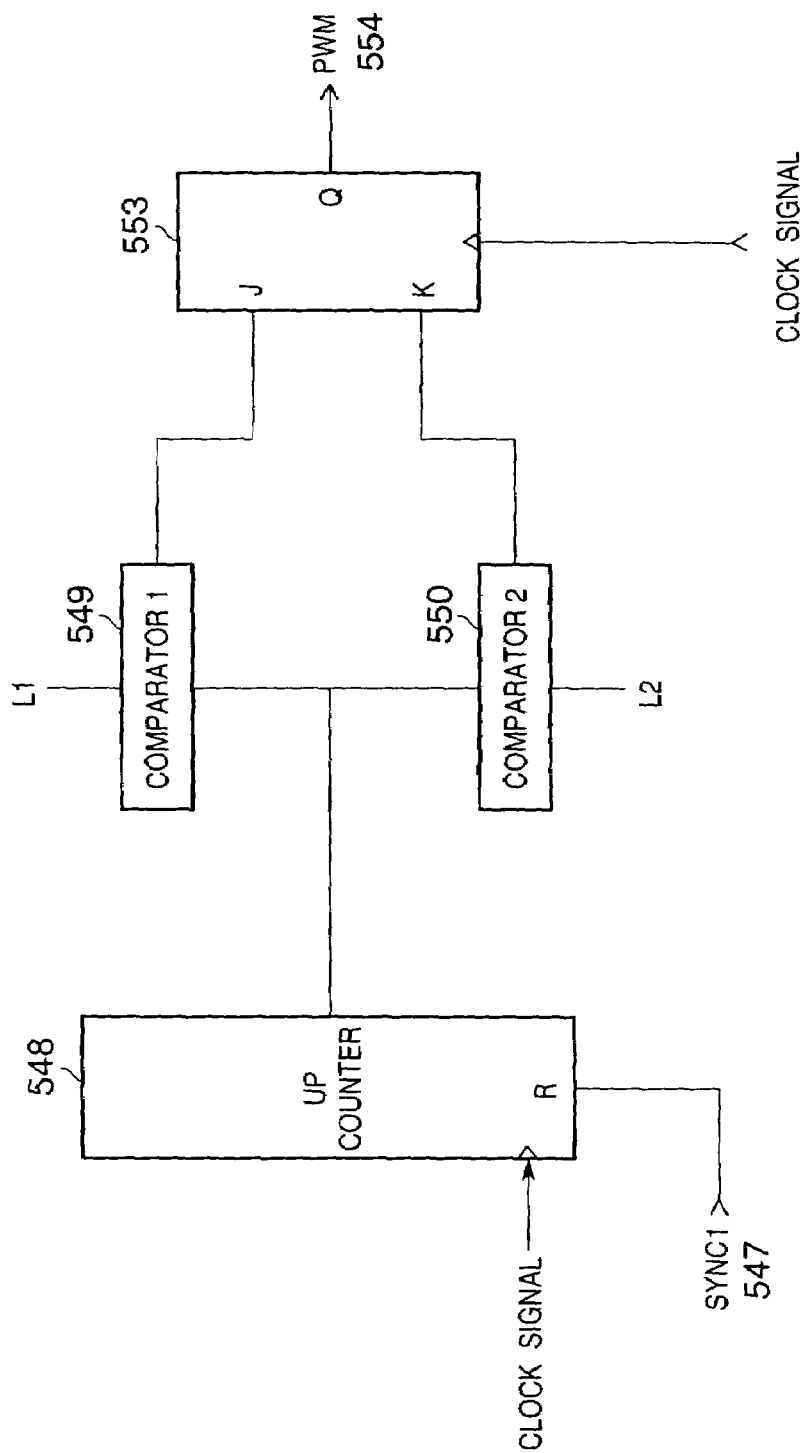
FIG. 17 is a block diagram showing details of a PWM signal generation unit included in the control unit shown in FIG. 13.

FIG. 17 is a block diagram of the PWM signal generation unit 541.

Referring to FIG. 17, reference numeral 548 denotes an up counter; 549 and 550, comparators, and 553, a JK flip-flop.

The counter 548 is reset by a main scanning sync signal 547 (SYNC) from the image processing unit 22 or the like and incremented in accordance with a clock signal. The comparators 549 and 550 determine the rise and fall timings. The JK flip-flop 553 generates a PWM signal in accordance with outputs from the comparators 549 and 550. The output values L1 and L2 from the calculator 561 are set in the comparators 549 and 550, respectively.

Output signals on the circuit shown in the block diagram of FIG. 14, that are obtained by such a control scheme, will be described with reference to FIGS. 18A and 18B.

As output signals, a Sync signal, a PWM signal, a control current waveform (tube current), and a light amount will be described.

Figure 18A:
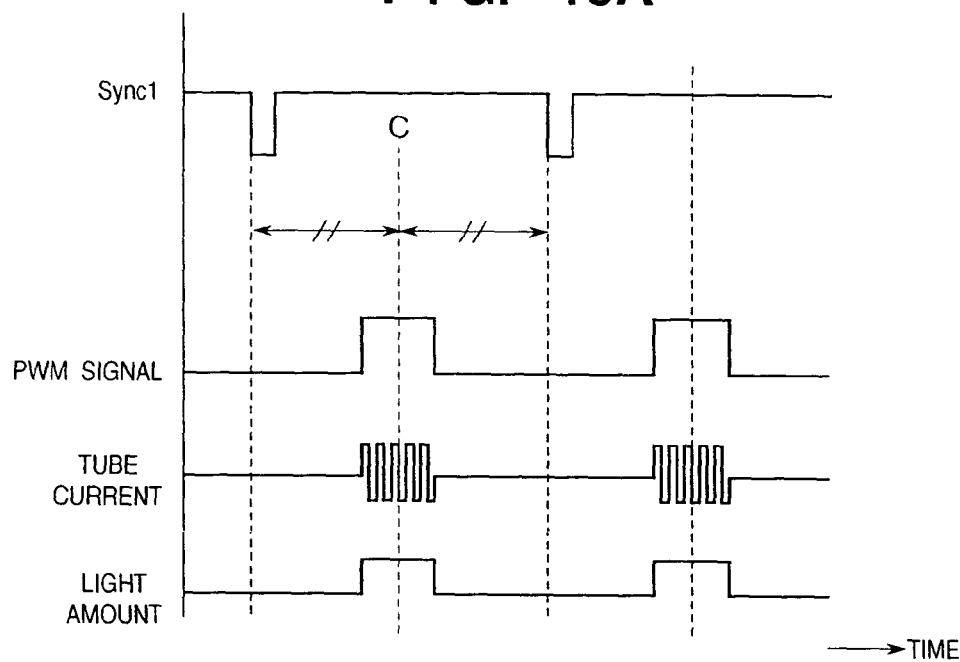
FIGS. 18A and 18B are timing charts for explaining a dimming control method according to the fifth embodiment of the present invention.
Figure 18B:
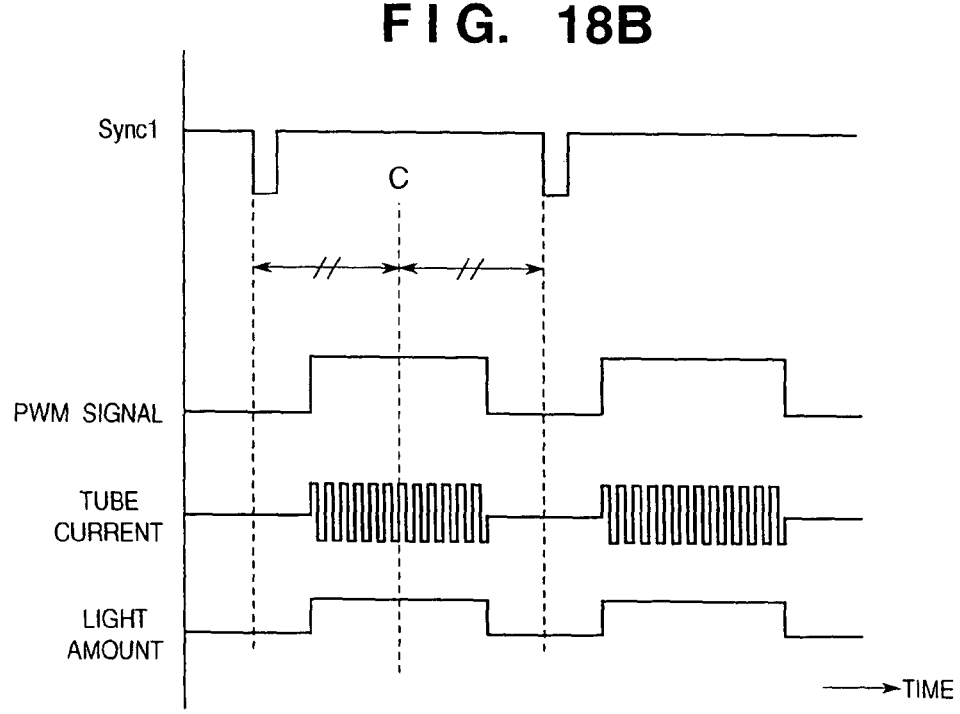

Referring to FIGS. 18A and 18B, the abscissa represents time, and the ordinate represents the output signals.

FIG. 18A shows the output signals when the duty ratio is about 25%. FIG. 18B shows the output signals when the duty ratio is about 60%.

Sync1 represents a Sync signal output from a Sync generator 516 shown in the block diagram of FIG. 13.

The PWM signal of high level is output from the light amount controller 514 continuously during a period corresponding to the duty value.

On the basis of the PWM signal, the inverter 527 supplies a current having a frequency sufficiently higher than that of the PWM signal to the fluorescent lamp 510.

Referring to FIGS. 18A and 18B, the tube current represents a current signal output from the inverter 527. In response to this tube current, the fluorescent lamp 510 is turned on to emit light in a substantially predetermined amount corresponding to a current value obtained by averaging the tube current.

A line C at the center of the PWM signal, tube current, and light amount signal in the ON state of the fluorescent lamp matches the center of the period of the sync signal Sync1 from the fall timing to the next fall timing, that corresponds to one storage time of a solid-state image sensing element 58.

Referring to FIG. 18B as well, the center C of the PWM signal, tube current, and light amount signal matches the center of the periodical signal Sync1. In FIG. 18B, the duty ratio is about 60%. Even when the duty ratio changes, the central position of the ON control signal does not change over time and is located at the center C of the periodical signal Hsync. Even when the afterglow characteristics of phosphors change in units of colors, the barycenter position of the light amount can always be located near the center of the periodical signal Hsync. Hence, the light amount of afterglow in the OFF period can be averaged near the ON period in one storage time, and the change in barycenter position can be minimized.

As described above, according to the fifth embodiment, when an original image is to be read using a white light source having phosphors of a plurality of colors, which have different afterglow characteristics, barycenter movement of the read position in the sub-scanning direction, which occurs in units of colors depending on the afterglow characteristics of the light source, can be reduced or corrected. More specifically, pulse-width modulation is used as a light amount control means for the light source, and a control pulse is generated symmetrically with respect to the center of the periodical signal Hsync along the time axis. With this arrangement, even when the afterglow characteristics of colors contained in the light source change, the barycenter position of the light amount can always be located near the center of the periodical signal Hsync. Hence, the light amount of afterglow in the OFF period can be averaged near the ON period in one storage time, the change in barycenter position can be minimized, and color misregistration in reading in the sub-scanning direction can be reduced.

(Sixth Embodiment)

Figure 19:
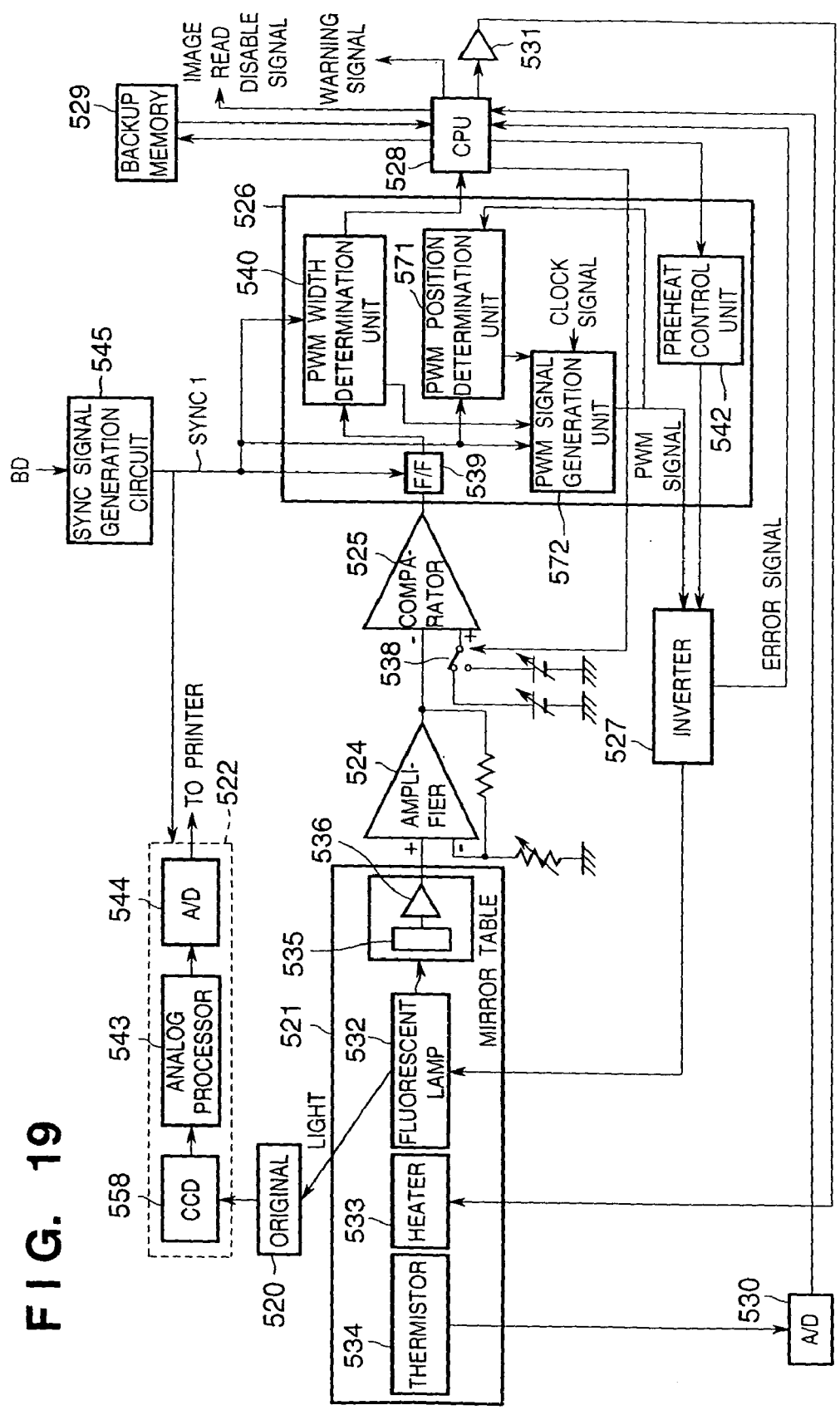
FIG. 19 is a block diagram showing details of the arrangement of the control unit of an image reading apparatus according to the sixth embodiment of the present invention.

FIG. 19 is a block diagram showing the arrangement of an image reading apparatus according to the sixth embodiment.

Referring to FIG. 19, a light amount controller 526 comprises a flip-flop circuit 539 for outputting a light amount comparison signal from a comparator 525, which is phase-locked with a sync signal, a PWM width determination unit 540 incrementing/decrementing the counter in synchronism with a sync signal (SYNC1) on the basis of the light amount comparison signal and determining the PWM width, a PWM signal generation unit 572 for outputting a PWM signal having a PWM width determined at a desired position and phase-locked with the sync signal (SYNC1), a PWM position determination unit 571 for determining the position of the PWM signal, and a preheat control unit 542 for preheating a fluorescent lamp 532 before it is turned on.

Figure 20:
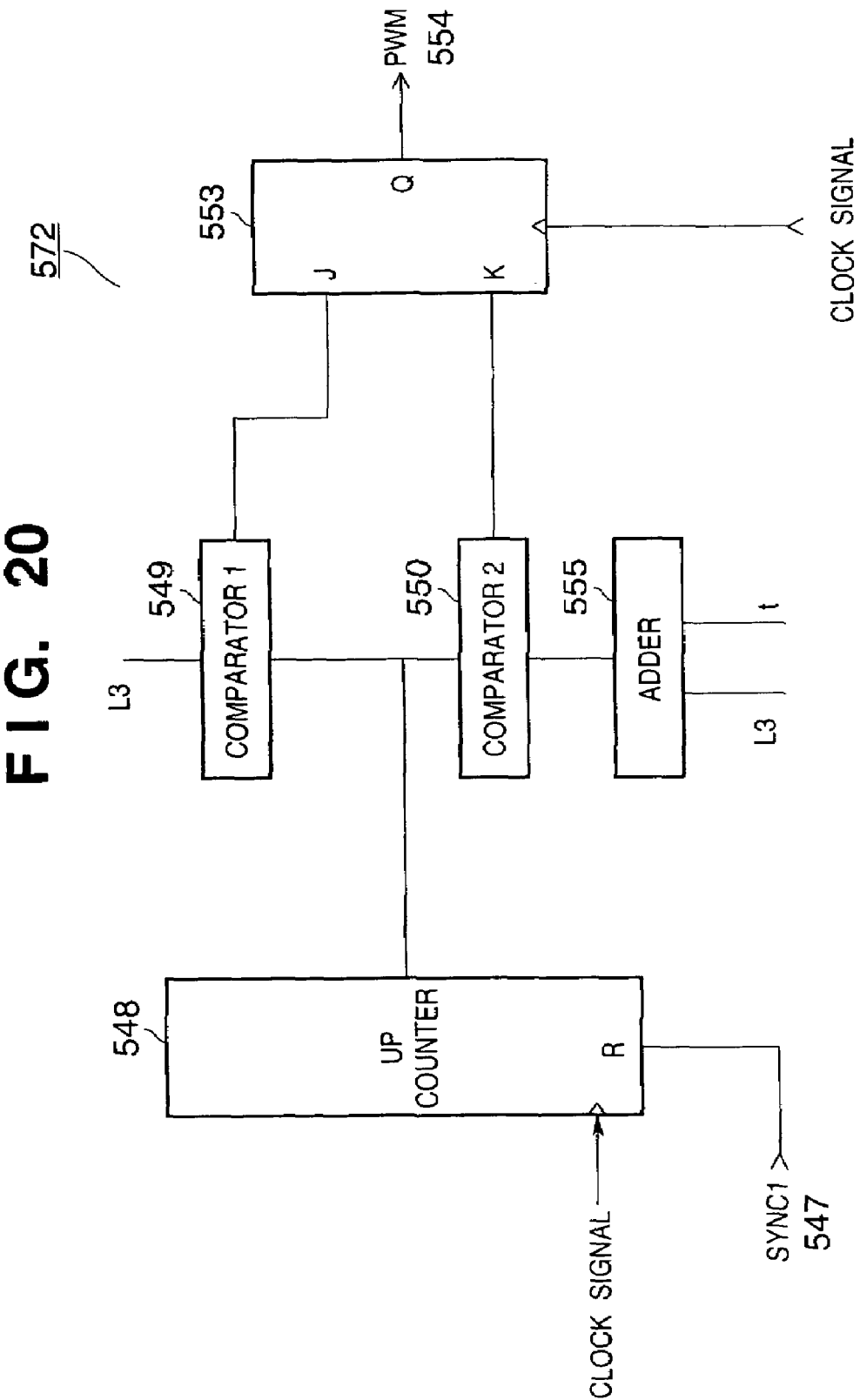
FIG. 20 is a block diagram showing details of a PWM signal generation unit contained in the control unit shown in FIG. 19.

FIG. 20 is a block diagram showing the arrangement of the PWM signal generation unit 572.

Referring to FIG. 20, reference numeral 548 denotes an up counter; 549 and 550, comparators; 553, a JK flip-flop, and 555, an adder.

The counter 548 is reset by a main scanning sync signal 547 (SYNC1) from an image processing unit 22, or the like, and incremented in accordance with a clock signal. The adder 555 adds an output t from the PWM width setting unit 540 and an output L3 from the PWM position determination unit 571. The comparators 549 and 550 determine the rise and fall timings of a control pulse. The JK flip-flop 553 generates a PWM signal in accordance with outputs from the comparators 549 and 550. The output L3 from the PWM position determination unit 571 and an output from the adder 555 are set in the comparators 549 and 550, respectively.

Figure 21:
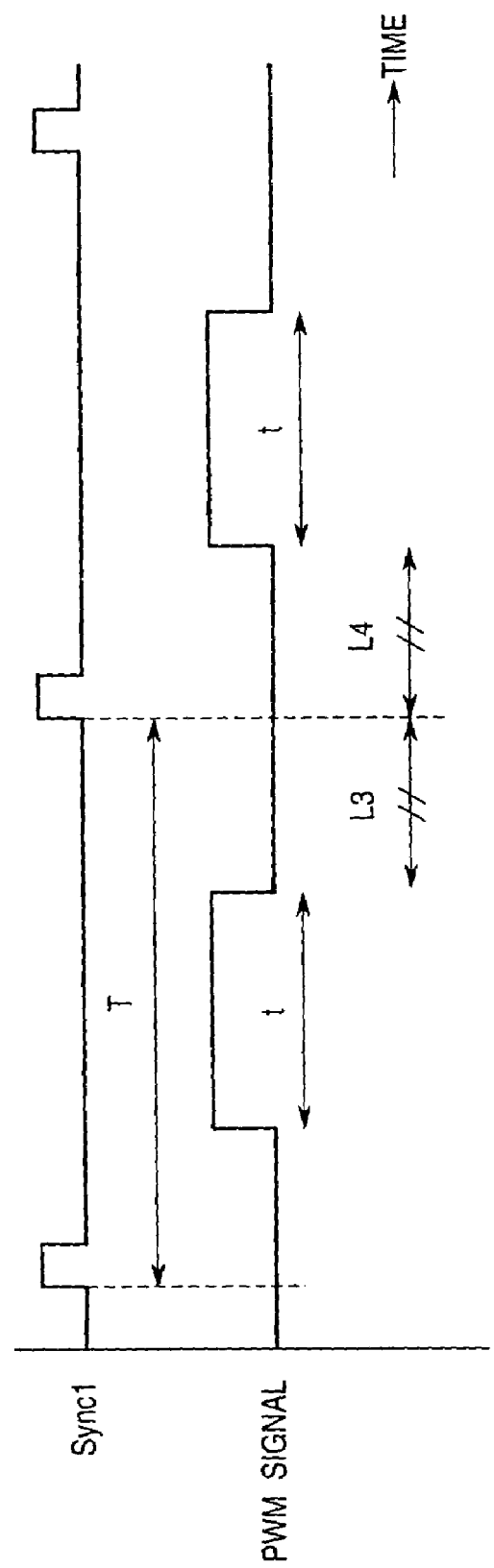
FIG. 21 is a timing chart for explaining the operation of the PWM signal generation unit shown in FIG. 20.

The operation of this embodiment will be described with reference to the timing chart shown in FIG. 21. The output from the PWM signal generation unit 572 need be set at the center of one sync signal (one SYNC period: time T). For this purpose, the time (L3 in FIG. 21) from the end of the PWM signal to the start of the next SYNC period is regarded as the PWM start time (L4 in FIG. 21) of the next SYNC period.

Hence, the PWM position determination unit 571 is formed from a counter for obtaining the time L3 from the output from the PWM signal generation unit 572 and the sync signal (SYNC). The output from the PWM position determination unit 571 corresponds to the time L3. By inputting the time L3 to the PWM signal generation unit 572, as shown in FIG. 20, a desired PWM signal can be obtained.

According to the sixth embodiment, the control pulse is generated symmetrically with respect to the center of the storage time T along the time axis, and the same effect as in the first embodiment can be obtained.

When the average value of L3 in a predetermined time is input to the comparator 549 and adder 555 instead of directly inputting the output L3 from the PWM position determination unit 571 to the comparator 549 and adder 555, the variation in phase of the control pulse can be substantially eliminated.

(Seventh Embodiment)

Figure 22:
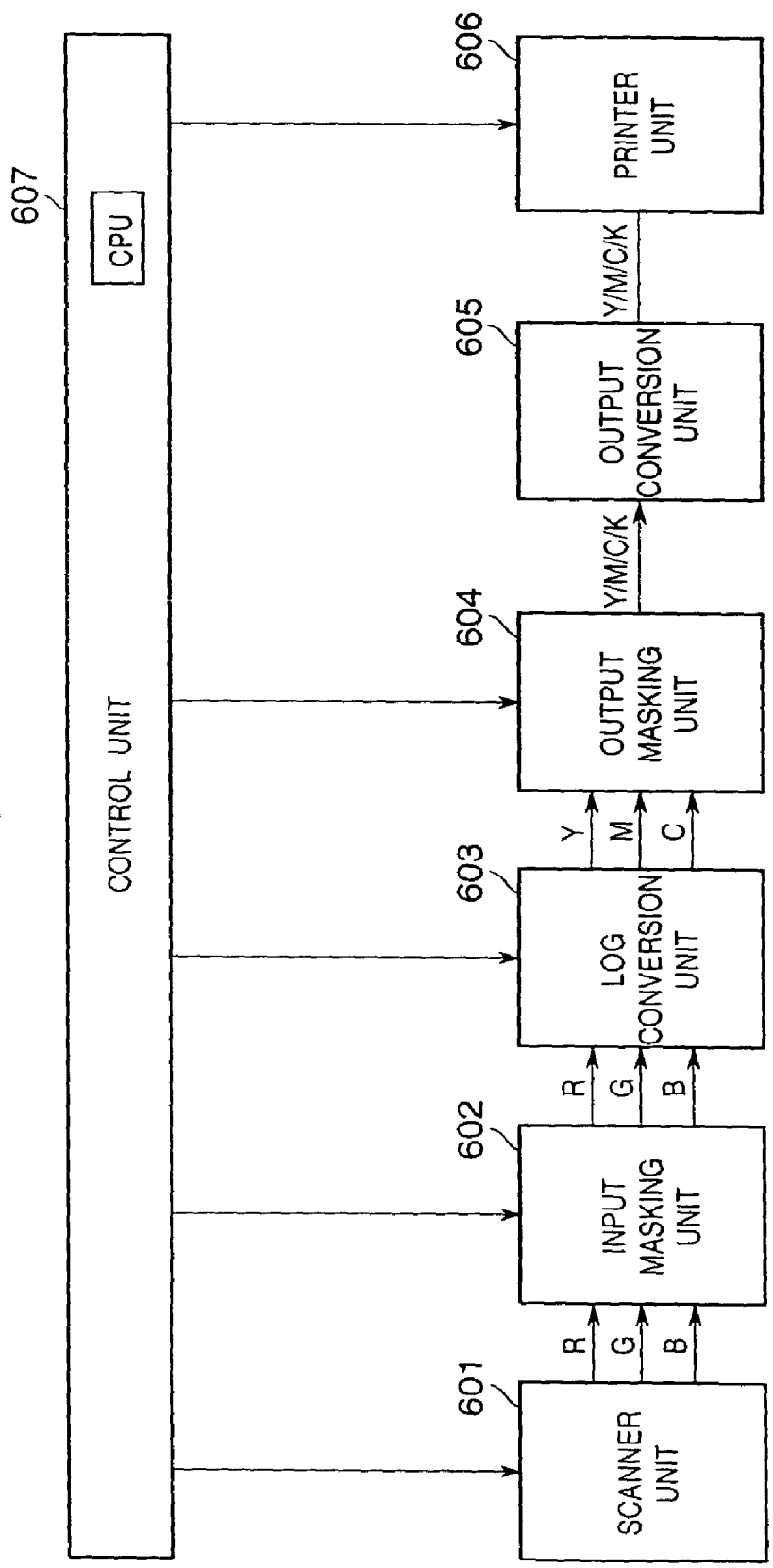
FIG. 22 is a block diagram showing the schematic arrangement of a copying machine having, in the scanner unit, an image reading apparatus according to the seventh embodiment of the present invention.

FIG. 22 is a block diagram showing the arrangement of principal part of a copying machine having an image reading apparatus according to the seventh embodiment.

Figure 29:
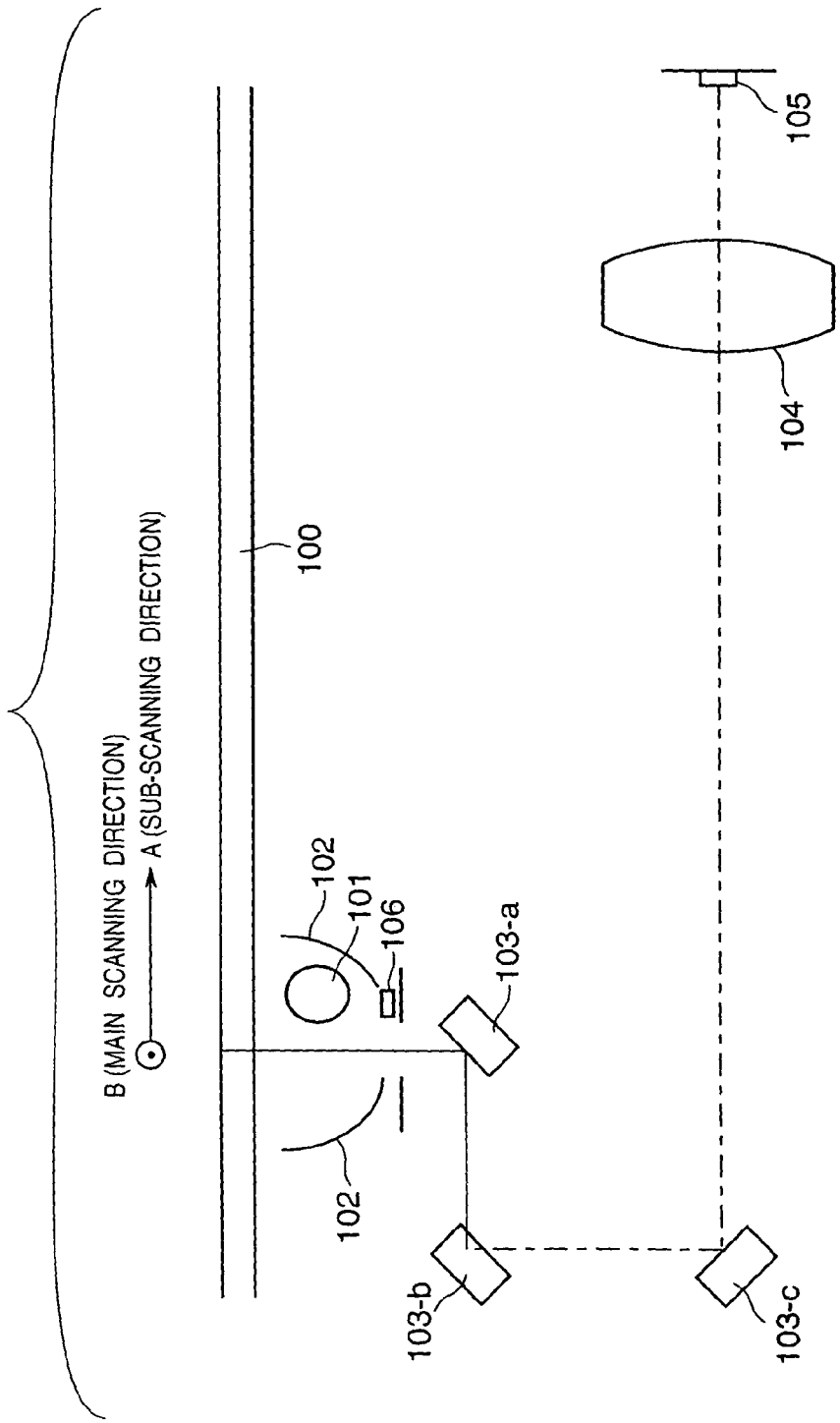
FIG. 29 is a schematic view showing the optical system of a general image reading apparatus.

Referring to FIG. 22, a scanner unit 601 reads an original placed on an original table. As a rod-shaped light source, a white fluorescent lamp in which phosphors corresponding to the R, G, and B colors are mixed and applied is used. As photoelectric conversion elements, three CCD line sensors of R, G, and B colors are used. These line sensors have a general structure as in the optical system shown in FIG. 29.

Figure 23:
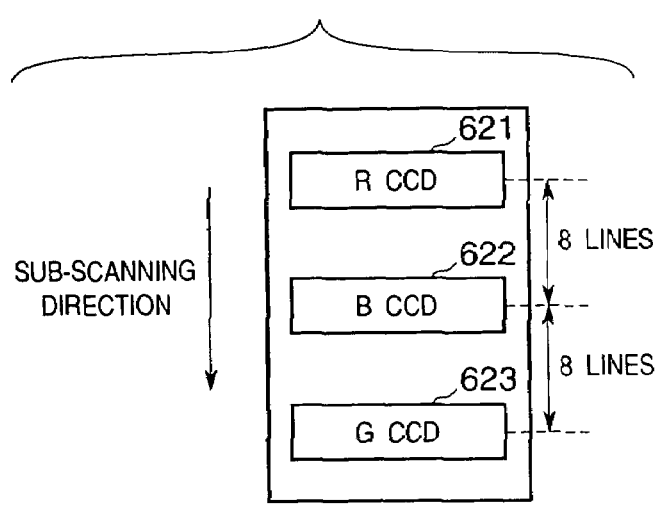
FIG. 23 is a view showing the layout of line sensors included in the scanner unit of the copying machine shown in FIG. 22.

FIG. 23 shows the layout of the three line sensors. CCD line sensors 621, 622, and 623 are laid out with an offset corresponding to 8 lines therebetween and sequentially read an original image on the original table by scanning the same mirror optical system as in FIG. 29.

Since the CCD line sensors 621, 622, and 623 are laid out with an offset of 8 lines therebetween, they read the original image at positions shifted by 8 lines at the same time.

The original image read positions at the same time will be compared. The read position of the G CCD line sensor 623 is most advanced. With respect to the read position of the G CCD line sensor 623, the read position of the B CCD line sensor 622 is delayed by 8 lines, and that of the R CCD line sensor 621 is delayed by 16 lines.

Figure 24:
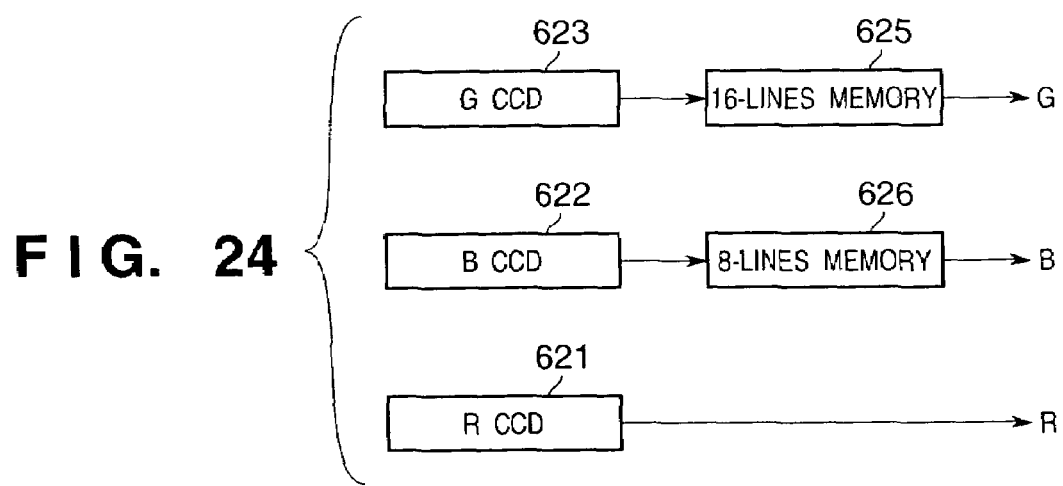
FIG. 24 is a view showing an arrangement for phase-matching read signals from the line sensors included in the scanner unit of the copying machine shown in FIG. 22.

FIG. 24 shows a block for correcting the different read positions.

Referring to FIG. 24, reference numeral 625 denotes a 16-line memory for delaying image signals of 16 lines; and 626, and 8-line memory for delaying image signals of 8 lines. An output from the G CCD line sensor 623 is input to the 16-line memory 625 and delayed by 16 lines. The signal delayed by 16 lines is output from the 16-line memory 625.

As described above, the G CCD line sensor 623 is laid out at a position offset from the R CCD line sensor 621 by 16 lines. As outputs from the 16-line memory 625, the read position of the output from the G CCD line sensor and that of the output from the R CCD line sensor correspond to the same line on the original.

Similarly, an output signal from the B CCD line sensor 622 is delayed by 8 lines by the 8-line memory 626. As outputs from the 8-line memory 626, the read position of the output from the B CCD line sensor 622 and that of the output from the G CCD line sensor 621 correspond to the same line on the original.

As described above, the shift in read position between the three CCD line sensors 621, 622, and 623 for R, G, and B components, which are laid out with an offset, is corrected by the block shown in FIG. 24. Hence, as outputs from the block shown in FIG. 24, R, G, and B signals corresponding to the same position on the original image can be obtained.

The output signals shown in FIG. 24 are subjected to well-known shading correction to correct a light-emitting variation of the fluorescent lamp and output from the scanner unit 601. An input masking unit 602 corrects the color balance between the R, G, and B signals output from the scanner unit 601. The input masking unit 602 performs masking processing using well-known 3×3 matrix calculation below.

$Rout = K00 \times Rin + K01 \times Gin + K02 \times Bin$ $Gout = K10 \times Rin + K11 \times Gin + K12 \times Bin$ $Bout = K20 \times Rin + K21 \times Gin + K22 \times Bin$ where K00 to K22 are constants.

Output signals from the input masking unit 602 are input to a LOG conversion unit 603.

R, G, and B signals input to the LOG conversion unit 603 are converted into Y, M and C density signals by well-known logarithmic transformation and input to an output masking unit 604. The output masking unit 604 performs making correction processing for the received Y, M and C signals in consideration of the characteristics of color materials used for printing and printing characteristics of the printer. With this processing, Y, M, C and K signals are generated, and the generated surface-sequential signals are output.

However, in this embodiment, one of the Y, M, C, and K signals is selectively output from the output masking unit 604. Every time the scanner unit 601 scans the original, the signal output from the output masking unit 604 is switched between the Y, M, C, and K signals. Every time the scanner unit 601 scans the original, and image signal corresponding to a color material of yellow, magenta, cyan, and black is output. When the scanner unit 601 scans one original four times, a full-color print image is output from a printer unit 606. The output signal from the output masking unit 604 is input to an output conversion unit 605. The output conversion unit 605 corrects the density signal level (γ correction) in accordance with the gradation characteristics of the printer, converts the input 8-bit multilevel Y, M, C, and K signals into 1-bit binary signals by pseudo halftone processing, and outputs the signals to the printer unit 606. The printer unit 606 controls printing on a printing paper sheet in accordance with the 1-bit Y, M, C, and K signals output from the output conversion unit 605 to form a printed image. A control unit 607 controls the entire apparatus, i.e., controls the operation of the apparatus in accordance with an input from an operation unit (not shown).

A barycenter shift in read position in the sub-scanning direction, that is generated due to the difference in attenuation characteristics between the R, G, and B colors when a white fluorescent lamp in which phosphors corresponding to the R, G, and B colors are mixed and applied to the inner wall of the tube is used as a light source will be described below in detail.

The phenomenon that the barycenter of the read position in the sub-scanning direction changes depending on the color occurs due to the difference in read position between the CCD line sensors 621, 622, and 623 of the R, G, B colors. This will be described with reference to FIGS. 25A to 25D.

FIG. 25A is a view showing the layout of the CCD line sensors 621, 622, and 623 of R, G, and B colors. Referring to FIG. 25A, the CCD line sensors 621, 622, and 623 are physically laid out at an interval of 8 lines. The phase relationship between the original image read signals output from the CCD line sensors is represented by adding, to the physical interval of the layout of the CCD line sensors, i.e., 8 lines, the difference in barycenter position, that is generated by the difference in attenuation characteristics between the R, G, and B colors in the light-emitting amount of the fluorescent lamp. The phase differences between the R, G, and B read signals, including the difference in barycenter position, can be represented as follows.

The phase difference between the B read signal and R read signal $= 8 + (Kb - Kr), Kb - Kr < 0$ The phase difference between the G read signal and B read signal $= 8 + (Kg - Kb), Kg - Kb > 0$ The phase difference between the G read signal and R read signal $$=8+(Kg-Kr), Kg-Kr \doteq 0$$

where Kr, Kg, and Kb are the barycenter movement distances of the R, G, and B colors in the light-emitting amounts. The values Kr and Kg are larger than the value Kb. The values Kr and Kg almost equal.

This yields $$|Kb-Kg|>|Kb-Kr|>|Kg-Kr|$$

As described above, because of the differences between the color barycenter positions, the phase difference between the B read signal and R read signal is smaller than 8 lines. The phase difference between the G, and B read signals is larger than 8 lines. The phases of the G read signal and R read signal are almost equal to 16 lines.

As for correction of the read positions of the CCD line sensors 621, 622, and 623 of R, G, and B colors, the phases of the read signals of different colors are set in order by the arrangement shown in FIG. 24, so the phase difference between read positions, that is larger than 8 lines, is a steady offset component.

Figure 28:
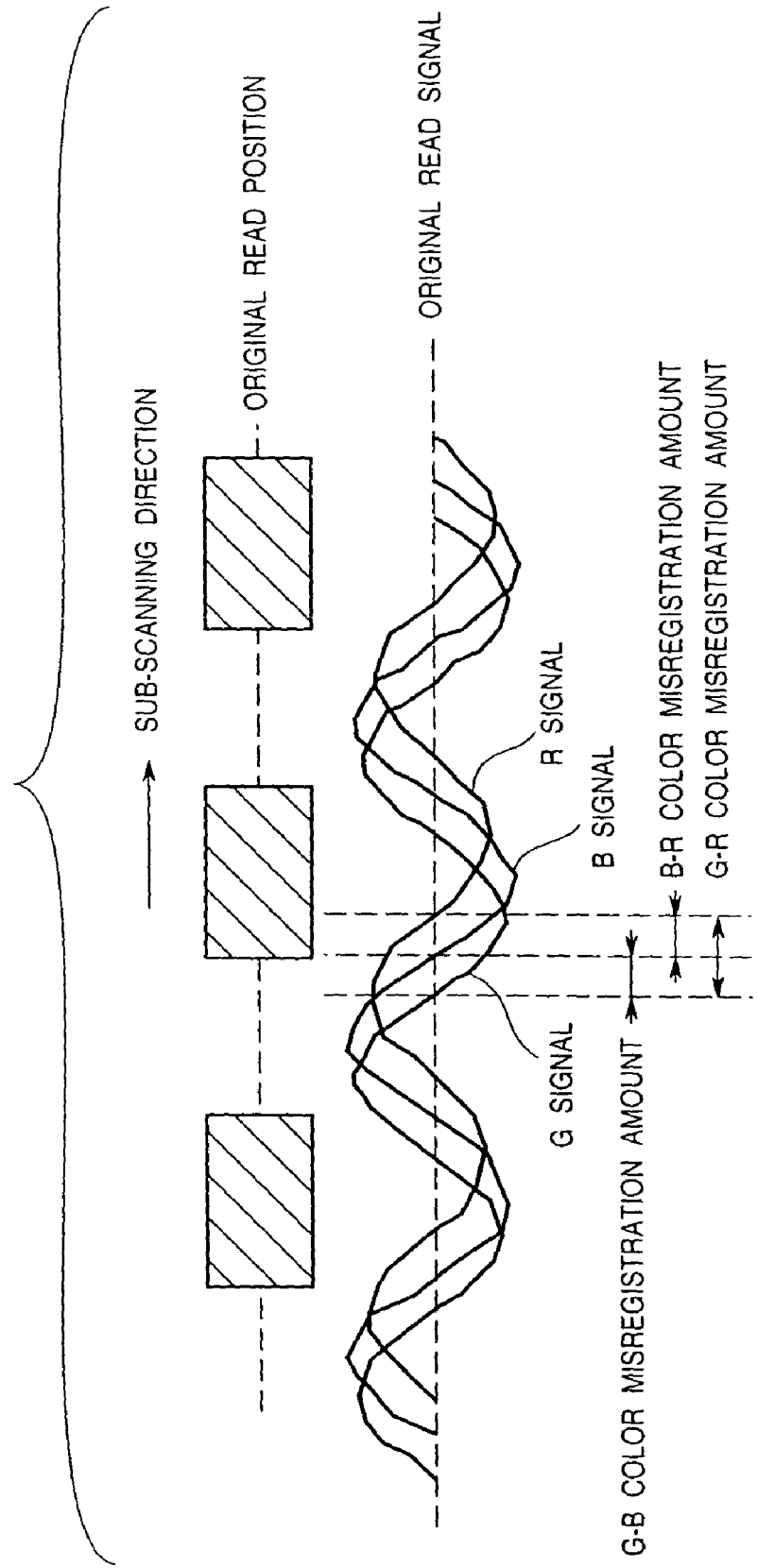
FIG. 28 is a view for explaining color misregistration amounts between the different color components of read signals output from the R, G, and B line sensors.

This state is shown in FIGS. 25B to 25D as color misregistration amounts between the colors. A color misregistration amount is the amount of shift in read position between the colors, that is generated at the edge portion between white and black portions when an original image with a black and white repeating pattern as shown in FIG. 28 is read.

Vibration components in FIGS. 25A to 25D are components generated when the read positions of the CCD line sensors 621, 622, and 623 of the respective colors shift due to the influence of vibration in the mirror optical system when it scans. For example, the vibration component of the G–R color misregistration amount in FIG. 25B is generated by the difference in the magnitude and direction of vibration at a position separated by 16 lines during scanning by the mirror optical system.

Generally, the vibration period of the mirror optical system is longer than the interval between the CCD line sensors of the respective colors. For this reason, the vibration component between colors with the largest interval becomes larger than the vibration components between the remaining colors. Let D be the vibration component of the G–R color misregistration amount. The B–R and G–B color misregistration vibration components are ½ the G–R color misregistration vibration component and represented by D/2.

The average value of color misregistration amounts between the colors corresponds to a component generated by the above-described difference between barycenter positions of the light-emitting amounts and appears as a color misregistration offset component. The amount of the color misregistration vibration component D is larger than the color misregistration amount offset amount generated by the difference between barycenter positions of the light-emitting amounts. A maximum color misregistration amount M1 in the CCD layout shown in FIG. 25A is generated by the G–R color misregistration and given by $$M1=|Kg-Kr|+D/2$$

As a reference, other layouts of the R, G, and B CCD line sensors 621, 622, and 623 are shown in FIGS. 26A to 26D and 27A to 27D.

In these examples, the B CCD line sensor that has the minimum amount of barycenter movement in the light-emitting amount is laid out not at the center but at the end portion.

In the layout shown in FIG. 26A, the color misregistration offset component generated by barycenter movement in the light-emitting amount is maximized between B and G colors, as shown in FIG. 26D. As shown in FIG. 26B, the B–R color misregistration offset component substantially equals the B–G color misregistration offset component.

The absolute value |Kg–Kr| of the difference between the B–R color misregistration offset component Kb–Kr and B–G color misregistration amount offset component Kb–Kg is sufficiently smaller than the value of the vibration component D/2.

Hence, the B–R color misregistration generated by the color misregistration amount vibration component D due to the vibration factor of the mirror optical system has a maximum color misregistration amount M2. The maximum color misregistration amount M2 is given by $$M2=|Kb-Kr|+D/2$$

Figure 27A:
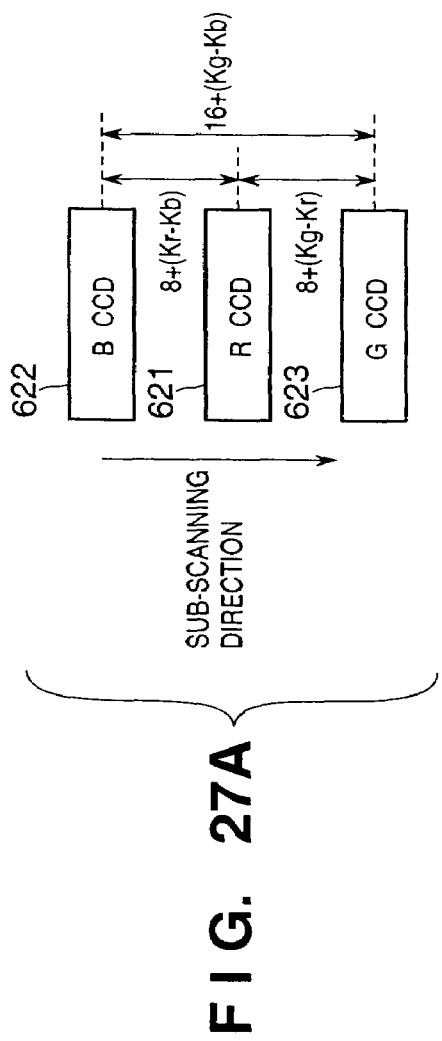
FIG. 27A is a view showing a layout of R, G, and B line sensors, which is different from that shown in FIG. 25A.
Figure 27D:
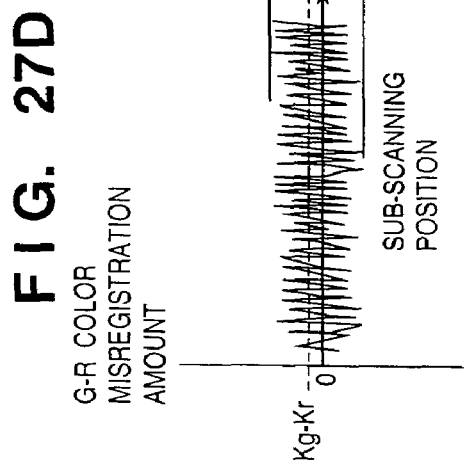
FIGS. 27B to 27D are views showing the color misregistration amounts of the R, G, and B line sensors with the layout shown in FIG. 27A.
Figure 27C:
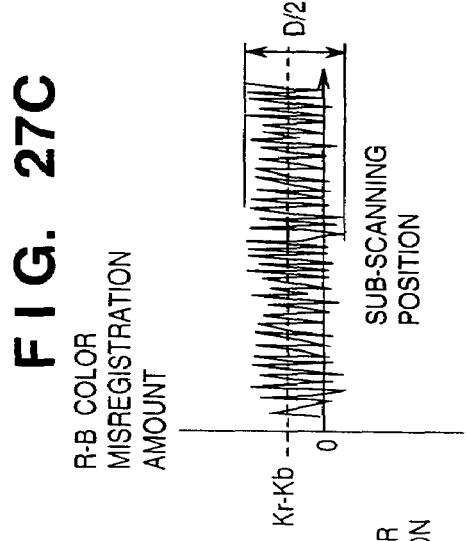
Figure 27B:
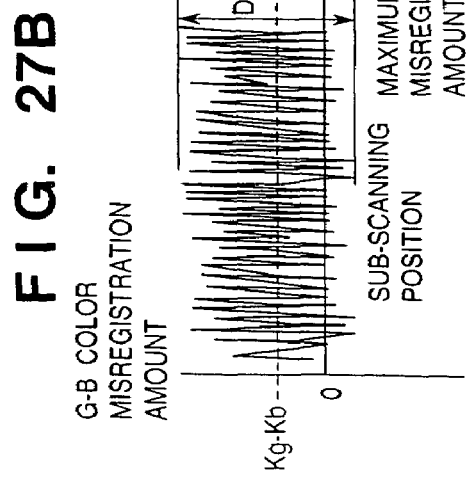

Similarly, a maximum color misregistration amount M3 in the CCD layout shown in FIG. 27A is the G–B color misregistration amount and is given by:

$$M3=|Kg-Kg|+D/2$$

The maximum color misregistration amounts in the above-described layouts of CCDs of the colors will be compared. Because of the barycenter movement amount in the light-emitting amount.

$$|Kg-Kr|<|Kb-Kr|<|Kg-Kb|$$

The following relationship holds between the maximum color misregistration amounts.

M1<M2<M3

That is, when a CCD line sensor corresponding to a color with a large difference in barycenter movement in the light-emitting amount is not located at an end, as shown in FIG. 25A, the maximum color misregistration amount can be minimized.

In this embodiment, the afterglow characteristics of the light source are smallest for the B color component and larger for the R and G color components. However, the afterglow characteristics of the light source change depending on the materials of the phosphors used. When line sensors corresponding to two colors with the largest difference in characteristics are not laid out at two ends, the color misregistration amount between the two colors at the two ends can be reduced, as is apparent from the description of the above embodiment. In this embodiment, the three line sensors are laid out at an interval of 8 lines. However, the present invention is not limited to this.

As described above, according to the seventh embodiment, when a white light source having phosphors with different afterglow characteristics in units of read colors corresponding to the R, G, and B line sensors is used, the layout of the R, G, and B line sensors is determined in consideration of the magnitudes of the afterglow characteristics. More specifically, line sensors corresponding to two colors with the largest difference in afterglow characteristics are not laid out at two ends. With this arrangement, the influence of read position shift between the colors due to read position barycenter movement in the sub-scanning direction, that is generated by the difference in the afterglow characteristics of the light source, can be prevented from conspicuously appearing in read signals, and degradation in image quality due to color misregistration can be minimized.

In the above-described embodiments, a fluorescent lamp for emitting white light containing R, G, and B color components is used as a light source. However, the present invention is not limited to this and can also be applied to an image reading apparatus using, as a light source, fluorescent lamps of a plurality of colors, which are turned on to generate pseudo white light. In this case, a driving pulse is generated symmetrically with respect to the reference position along the time axis in accordance with an increase in dimming duty. In the above embodiments, a reflective original is read. However, the present invention is not limited to this, and a transparent original may be read.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus for irradiating an original image with a light source and forming an image corresponding to the original image on an image sensing device through an imaging optical system to read the original image, comprising:
   control means for shifting an ON start timing of the light source for illuminating the original image from a start timing of a predetermined charge storage period of the image sensing device,
   wherein said control means controls a phase of a control pulse for driving the light source so as to shift the ON start timing of the light source.

2. The apparatus according to claim 1, wherein said control means generates the control pulse symmetrically with respect to a predetermined reference timing in the charge storage period along a time axis.

3. The apparatus according to claim 2, wherein said control means uses the reference timing as a central position of the charge storage period along the time axis.

4. The apparatus according to claim 2, wherein said control means uses the reference timing as a start timing or an end timing of the charge storage period.

5. The apparatus according to claim 2, wherein said control means determines a start timing or an end timing of the control pulse in accordance with a duty ratio of the control pulse, that is determined by pulse-width modulation in accordance with the charge storage period and a magnitude of an output signal from the image sensing device, so as to generated the control pulse substantially symmetrically with respect to the reference timing along the time axis.

6. The apparatus according to claim 1, wherein the light source comprises a fluorescent lamp.

7. The apparatus according to claim 6, wherein a plurality of phosphors applied to an inner wall of a tube of the fluorescent lamp have afterglow characteristics different from each other.

8. The apparatus according to claim 1, wherein the image sensing device comprises a plurality of line sensors for reading images of different color components.

9. The apparatus according to claim 1, wherein said control means controls a duty ratio of a control pulse by pulse-width modulation.

10. The apparatus according to claim 9, further comprising a memory storing relationships between phases and duty ratios of the control pulse, and wherein said control means, in controlling the phase of the control pulse for driving the light source, adjusts the phase of the control pulse with reference to said memory in accordance with the duty ratio of the control pulse, which is determined by pulse-width modulation.

11. An image reading apparatus for irradiating an original image with a light source and forming an image corresponding to the original image on an image sensing device through an imaging optical system to read the original image, comprising:
   control means for shifting an ON start timing of the light source for illuminating the original image from a start timing of a predetermined charge storage period of the image sensing device,
   wherein the light source contains a plurality of color components which have afterglow characteristics different from each other.

12. The apparatus according to claim 11, wherein said control means causes the light source to emit the plurality of color components in accordance with the same control pulse.

13. A dimming control method for a light source in an image reading apparatus for irradiating an original image with the light source and forming an image corresponding to the original image on an image sensing device through an imaging optical system to read the original image, comprising:
   a control step of shifting an ON start timing of the light source for illuminating the original image from a start timing of a predetermined charge storage period of the image sensing device,
   wherein, in the control step, a phase of a control pulse for driving the light source is controlled so as to shift the ON start timing of the light source.

14. The method according to claim 13, wherein, in the control step, the control pulse is generated symmetrically with respect to a predetermined reference timing in the charge storage period along a time axis.

15. The method according to claim 14, wherein, in the control step, the reference timing is set at a central position of the charge storage period along the time axis.

16. The method according to claim 14, wherein, in the control step, the reference timing is set at a start timing or an end timing of the charge storage period.

17. The method according to claim 14, wherein, in the control step, a start timing or an end timing of the control pulse is determined in accordance with a duty ratio of the control pulse, that is determined by pulse-width modulation in accordance with the charge storage period and a magnitude of an output signal from the image sensing device, so as to generate the control pulse substantially symmetrically with respect to the reference timing along the time axis.

18. The method according to claim 13, wherein the light source contains a plurality of color components, and in the control step, the light source to emit the plurality of color components is emitted in accordance with the same control pulse.

19. The method according to claim 13, wherein, in the control step, a duty ratio of a control pulse is controlled by pulse-width modulation.

* * * * *

UNITED STATES PATENT AND TRADEMARK OFFICE
CERTIFICATE OF CORRECTION

PATENT NO. : 7,072,083 B2
APPLICATION NO. : 10/663481
DATED : July 4, 2006
INVENTOR(S) : Sato et al.

Page 1 of 1

It is certified that error appears in the above-identified patent and that said Letters Patent is hereby corrected as shown below:

In col. 1, line 33, please replace "sensors 105" with --sensor 105--.
In col. 6, line 19, please replace "FIG. 12A and 12C" with --FIGS. 12A to 12C--.
In col. 6, line 65, please replace "26B and 26D" with --26B to 26D--.
In col. 12, line 53, please replace "As in" with --As is--.
In col. 15, line 25, please replace "and A/D" with --an A/D--.
In col. 15, line 56, please replace "ouput" with --output--.
In col. 15, line 66, please replace "values" with --value--.
In col. 16, line 7, please replace "form" with --from--.
In col. 19, line 31, please replace "and" with --an --.
In col. 20, line 6, please replace "making" with --masking--.
In col. 20, line 17, please replace "and" with --an --.
In claim 5 (col. 23, line 49), please replace "generated" with --generate--.

Signed and Sealed this

Thirteenth Day of February, 2007

JON W. DUDAS
*Director of the United States Patent and Trademark Office*